United States Patent
Mutsuro et al.

(10) Patent No.: US 8,760,981 B2
(45) Date of Patent: Jun. 24, 2014

(54) OPTICAL DISC DEVICE AND OPTICAL DISC RECORDING/REPRODUCING METHOD

(75) Inventors: Yasuo Mutsuro, Yokohama (JP); Yutaka Nagai, Yokohama (JP); Koichiro Nishimura, Sagamihara (JP); Masakazu Ikeda, Odawara (JP); Osamu Kawamae, Kawasaki (JP)

(73) Assignees: Hitachi-LG Data Storage, Inc., Tokyo (JP); Hitachi Consumer Electronics Co., Ltd., Tokyo (JP)

(*) Notice: Subject to any disclaimer, the term of this patent is extended or adjusted under 35 U.S.C. 154(b) by 263 days.

(21) Appl. No.: 13/151,353

(22) Filed: Jun. 2, 2011

(65) Prior Publication Data

US 2011/0299369 A1 Dec. 8, 2011

(30) Foreign Application Priority Data

Jun. 2, 2010 (JP) ................ 2010-126437

(51) Int. Cl.
*G11B 7/00* (2006.01)
*G11B 5/86* (2006.01)
*G11B 3/64* (2006.01)
*G11B 7/28* (2006.01)

(52) U.S. Cl.
USPC ..... 369/44.32; 369/84; 369/30.05; 369/47.12

(58) Field of Classification Search
None
See application file for complete search history.

(56) References Cited

U.S. PATENT DOCUMENTS

| 6,675,179 B2 * | 1/2004 | Morohashi ............... 1/1 |
| 6,771,574 B2 * | 8/2004 | Fujimoto et al. ......... 369/47.1 |
| 2002/0031065 A1 * | 3/2002 | Kajiyama et al. ........ 369/47.23 |

FOREIGN PATENT DOCUMENTS

| EP | 2046028 A1 * | 4/2009 | ............ H04N 9/806 |
| JP | 06-274995 | 9/1994 | |

* cited by examiner

*Primary Examiner* — Joseph Feild
*Assistant Examiner* — Parul Gupta
(74) *Attorney, Agent, or Firm* — Antonelli, Terry, Stout & Kraus, LLP.

(57) ABSTRACT

There are provided an optical disc device and its recording/reproducing method for managing the management information about plural optical discs efficiently. In the present invention, the management information about the plural optical discs is stored in a memory. Moreover, the management information about part or all of the optical discs stored in the memory is recorded in the optical disc.

19 Claims, 20 Drawing Sheets

PLACEMENT EXAMPLE OF DISC MANAGEMENT INFORMATION AREA ACCORDING TO FIRST TO SIXTH EMBODIMENTS

PLACEMENT EXAMPLE 1 OF DEFECT MANAGEMENT INFORMATION ACCORDING TO FIRST EMBODIMENT

| DEFECT MANAGEMENT INFORMATION / DISC | DISC A | DISC B | DISC C | DISC D | DISC E |
|---|---|---|---|---|---|
| A | ✓ | ✓ | ✓ | ✓ | ✓ |
| B | | | | | |
| C | | | | | |
| D | | | | | |
| E | | | | | |

INITIALIZING PROCESS ACCORDING TO FIRST EMBODIMENT

RECORDING PROCESS ACCORDING TO FIRST EMBODIMENT

REPRODUCING PROCESS ACCORDING TO FIRST EMBODIMENT

EJECTING PROCESS ACCORDING TO FIRST EMBODIMENT

PLACEMENT EXAMPLE 2 OF DEFECT MANAGEMENT INFORMATION ACCORDING TO SECOND EMBODIMENT

| DISC \ DEFECT MANAGEMENT INFORMATION | DISC A | DISC B | DISC C | DISC D | DISC E |
|---|---|---|---|---|---|
| A | ✓ | ✓ | ✓ | ✓ | ✓ |
| B | ✓ | ✓ | ✓ | ✓ | ✓ |
| C | ✓ | ✓ | ✓ | ✓ | ✓ |
| D | ✓ | ✓ | ✓ | ✓ | ✓ |
| E | ✓ | ✓ | ✓ | ✓ | ✓ |

INITIALIZING PROCESS ACCORDING TO SECOND EMBODIMENT

EJECTING PROCESS ACCORDING TO SECOND EMBODIMENT

FIG. 11

PLACEMENT EXAMPLE 3 OF DEFECT MANAGEMENT INFORMATION
ACCORDING TO THIRD EMBODIMENT

| DISC \ DEFECT MANAGEMENT INFORMATION | DISC A | DISC B | DISC C | DISC D | DISC E |
|---|---|---|---|---|---|
| A |   | ✓ |   |   |   |
| B |   |   | ✓ |   |   |
| C |   |   |   | ✓ |   |
| D |   |   |   |   | ✓ |
| E | ✓ |   |   |   |   |

INITIALIZING PROCESS ACCORDING TO THIRD EMBODIMENT

EXAMPLE OF DISC ID ACCORDING TO FOURTH TO SIXTH EMBODIMENTS

FIG. 18

EXAMPLE OF AUTHENTICATION INFORMATION
ACCORDING TO FOURTH TO SIXTH EMBODIMENTS

| DISC ID OF DISC A |
| --- |
| DISC ID OF DISC B |
| DISC ID OF DISC C |
| DISC ID OF DISC D |
| DISC ID OF DISC E |

CONFIGURATION OF OPTICAL-DISC-DEVICE UNIT

ANOTHER OPTICAL DISC DEVICE (1)

ANOTHER OPTICAL DISC DEVICE (2)

ANOTHER PLACEMENT EXAMPLE OF
DEFECT MANAGEMENT INFORMATION

| DISC \ DEFECT MANAGEMENT INFORMATION | DISC A | DISC B | DISC C | DISC D | DISC E |
|---|---|---|---|---|---|
| A |  | ✓ | ✓ | ✓ | ✓ |
| B | ✓ |  | ✓ | ✓ | ✓ |
| C | ✓ | ✓ |  | ✓ | ✓ |
| D | ✓ | ✓ | ✓ |  | ✓ |
| E | ✓ | ✓ | ✓ | ✓ |  |

PLACEMENT EXAMPLE OF DISC ID
ACCORDING TO FOURTH TO SIXTH EMBODIMENTS

PLACEMENT EXAMPLE OF AUTHENTICATION INFORMATION
ACCORDING TO FOURTH TO SIXTH EMBODIMENTS

OPTICAL DISC DEVICE AND OPTICAL DISC RECORDING/REPRODUCING METHOD

INCORPORATION BY REFERENCE

The present application claims priority from Japanese application JP2010-126437 filed on Jun. 2, 2010, the content of which is hereby incorporated by reference into this application.

BACKGROUND OF THE INVENTION

The present invention relates to an optical disc recording/reproducing device and its operation method. More particularly, it relates to technologies effective to record/reproduce plural optical discs.

In enterprises, government and municipal offices, SOHO (Small Office/Home Office), individuals, etc., there exists a general tendency that the information amount of electronic data to be processed is becoming larger and larger. In accompaniment with this trend, a medium for storing the larger volume of information is becoming absolutely necessary. Meanwhile, people also tend to hang up "Green IT (Information Technology)" as keyword and introduce a lower-power-consumption appliance for the earth's environment protection. In a situation like this, attention has been focused on an optical disc as the above medium for storing the larger volume of information. This is because the optical disc hardly necessitates the power for storing information, and because the technological developments (the representative of which is BD (Blu-ray Disc)) for implementing even larger capacity are being made energetically.

Also, inventions have been made in order to solve problems of an optical-disc library device where plural these optical discs are used, and of an archive device whose main object is to backup electronic data.

For example, JP-A-6-274995 describes as follows (Summary of the Invention):

"Individual pieces of information about the defect management areas of individual optical discs 1 of plural optical disc cartridges 12B to 12G stored in a storage section 13 of the optical-disc library device are collected, and the individual pieces of information collected in this way are written in advance into the optical disc 1 of an optical disc cartridge 12A. Then, if a command of seeking an optical disc cartridge out of the optical disc cartridges 12B to 12G is issued, the information about the defect management area of the optical disc of the sought optical disc cartridge is read from the optical disc of the optical disc cartridge 12A. This reading operation makes it unnecessary to read the information about the defect management area of the sought optical disc at the time of initializing the optical disc. This makes it possible to shortening the initializing time."

SUMMARY OF THE INVENTION

In JP-A-6-274995, however, the optical disc, into which the information about the defect management areas are written, needs to be loaded and accessed every time the seeking command is issued. This means that an extra time becomes needed. Furthermore, in JP-A-6-274995, the problem of shortening the time is solved by adding the optical-disc drive device. The resultant presence of the plurality of optical-disc drive devices, however, gives rise to the occurrence of a problem that the control over the drive devices becomes complicated and troublesome.

The present invention has been devised in view of the problems as described above. Accordingly, an object of the present invention is to provide an optical disc device and its recording/reproducing method for allowing the management information about plural optical discs to be managed efficiently.

In order to solve the above problems, in the present invention, the management information about plural optical discs is stored in a memory, for example.

According to the present invention, it becomes possible to manage the management information about plural optical discs efficiently.

Other objects, features and advantages of the invention will become apparent from the following description of the embodiments of the invention taken in conjunction with the accompanying drawings.

BRIEF DESCRIPTION OF THE DRAWINGS

FIG. 11 is a diagram for illustrating a placement example 3 of the defect management information according to the third embodiment of the present invention;

FIG. 18 is a diagram for illustrating an example of the authentication information according to the fourth to sixth embodiments of the present invention;

DETAILED DESCRIPTION OF THE EMBODIMENTS

First Embodiment

Figure 1:
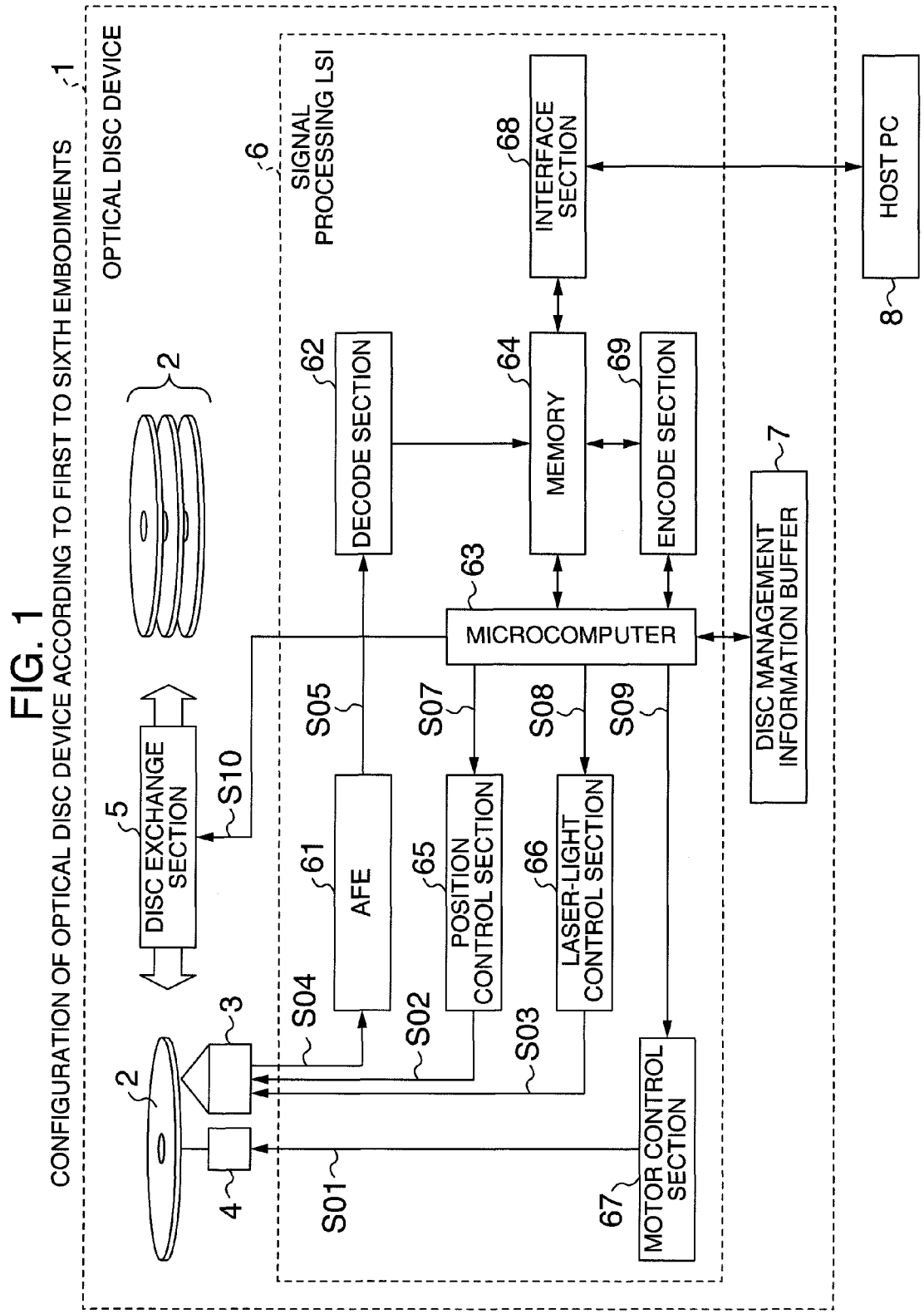
FIG. 1 is a diagram for illustrating the configuration of an optical disc device according to first to sixth embodiments of the present invention.

Referring to FIG. 1 to FIG. 7, a first embodiment of the present invention will be explained below. FIG. 1 illustrates a configuration example of the optical disc device of the embodiments of the present invention.

The optical disc device 1 according to the present embodiment includes a spindle motor 4 for rotationally-driving an optical disc 2, an optical pickup 3, a disc exchange section 5, a signal processing LSI 6 for performing a signal processing, and a disc management information buffer 7 for storing management information about the optical disc 2. Also, plural optical discs 2 are stored in the optical disc device 1. Hereinafter, the state where the optical discs 2 are stored in the optical disc device 1 will be described as being "optical discs are set".

The optical discs such as CD (Compact Disc), DVD (Digital Versatile Disc), and BD (Blu-ray Disc) are available as the plural optical discs 2 recorded/reproduced by the optical disc device 1. The optical discs available in the present invention, however, are not limited thereto. Of the plural these optical discs 2, an optical disc 2 to be recorded/reproduced is moved (hereinafter referred to as "load") by the disc exchange section 5 up to a position at which the optical pickup 3 can access the optical disc 2. Also, the individual optical discs 2 are not necessarily needed to be same-type optical discs. Namely, the discs such as CD, DVD, and BD may be mixed simultaneously, or a rewritable disc capable of overwriting data and a recordable disc capable of recording data may be mixed simultaneously. Also, the optical discs 2 in the optical disc device 1 can be ejected to the outside, and can be injected from the outside.

The optical pickup 3 undergoes the position control from the signal processing LSI 6 via a position control signal S02 to be move in the radius direction of the loaded optical disc 2 to the position at which the optical pickup 3 records/reproduces the optical disc 2. Also, the optical pickup 3 undergoes the laser-light control from the signal processing LSI 6 via a laser-light control signal S03, and converges the laser light by using an objective lens set up in the optical pickup 3 to illuminate the loaded optical disc 2 with the laser light for recording/reproducing. Moreover, the illuminating laser light is reflected by the loaded optical disc 2, and the reflected light is received by a not-illustrated light-receiving section in the optical pickup 3. The light-receiving section converts this reflected light into an electrical signal S04 to output the electrical signal to the signal processing LSI 6.

The spindle motor 4 undergoes the motor rotation control from the signal processing LSI 6 via a motor control signal S01 to rotate the loaded optical disc 2.

In accordance with a disc exchange command S10 from the signal processing LSI 6, the disc exchange section 5 performs the loading as follows: If an exchange-not-commanded optical disc 2 is loaded, the disc exchange section 5 exchanges the loaded optical disc 2 with an exchange-commanded optical disc 2. Also, if an exchange-commanded optical disc 2 has been loaded already, the disc exchange section 5 leaves the state as it is. Also, if no optical disc 2 has been loaded, the disc exchange section 5 loads an exchange-commanded optical disc 2.

The signal processing LSI 6 includes an AFE (Analog Front End) 61, a decode section 62, a microcomputer 63, a memory 64, a position control section 65, a laser-light control section 66, a motor control section 67, an interface section 68, and an encode section 69.

The AFE 61 performs an analog-signal processing such as amplification of the electrical signal S04 output from the optical pickup 3 to generate an analog signal S05 and output it to the decode section 62.

The decode section 62 digitizes the analog signal S05 to binary data, and then decodes the binary data to store the decoded result into the memory 64.

The microcomputer 63 controls the respective sections in the optical disc device 1. The microcomputer 63 itself is controlled based on software. At the time of recording/reproducing, the microcomputer 63 issues a position control command S07 to the position control section 65, a laser-light control command S08 to the laser-light control section 66, and a motor control command S09 to the motor control section 67. Also, the microcomputer 63 reads/writes data from/in the memory 64 properly. Also, the microcomputer 63 issues the disc exchange command S10 to the disc exchange section 5 in order to load the optical disc 2.

The memory 64 is a memory section such as SDRAM (Synchronous Dynamic Random Access Memory) or flash memory, and stores therein the data associated with the processing in the microcomputer 63.

The position control section 65 receives the position control command S07 from the microcomputer 63 to output the position control signal S02 to the optical pickup 3 so as to move the optical pickup 3 to the recording position or reproducing position.

The laser-light control section 66 receives the laser-light control command S08 from the microcomputer 63 to output the laser-light control signal S03 to the optical pickup 3 so as to record with a recording power specified by the microcomputer 63.

The motor control section 67 receives the motor control command S09 from the microcomputer 63 to output the motor control signal S01 to the spindle motor 4 so as to rotate the loaded optical disc 2 at a speed specified by the microcomputer 63.

The interface section 68 communicates with a host PC 8 in conformity with at least one of various interface standards such as ATAPI (ATA Packet Interface), USB (Universal Serial Bus), and IEEE1394, to collect/receive the command data and recorded data and store these data in the memory 64.

The encode section 69 performs the modulation processing of the recorded data stored in the memory 64 to convert the recorded data into the binary data in a format used to store data in the optical disc 2.

The disc management information buffer 7 is a nonvolatile memory such as flash memory or SSD (Solid State Disc), and stores therein the disc management information about the optical discs 2.

Figures 2, 3:
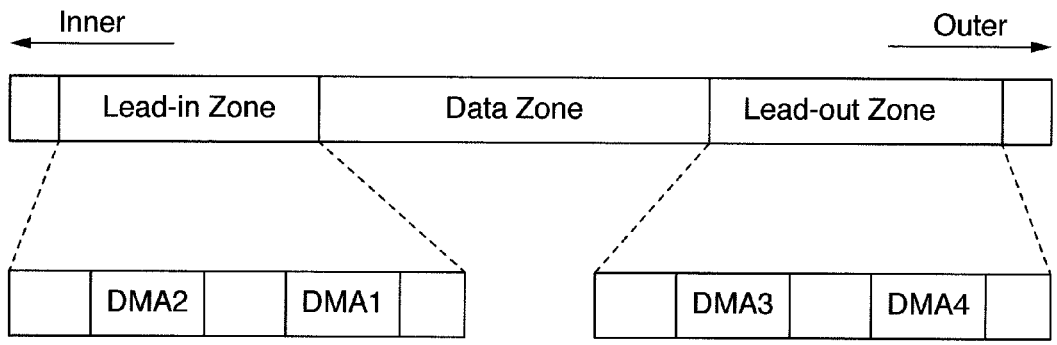
FIG. 2 is a diagram for illustrating a placement example of the disc management information area according to the first to sixth embodiments of the present invention.
FIG. 3 is a diagram for illustrating a placement example 1 of the defect management information according to the first embodiment of the present invention.

FIG. 2 illustrates a placement example of the Disc Management Area (hereinafter abbreviated as "DMA") in the optical disc 2 of the present embodiment. FIG. 2 illustrates the optical disc 2 is a single-layer disc, and the DMA (DMAs 1 to 4) is placed at four locations on each layer of the optical disc 2. More concretely, the two locations (DMAs 1 and 2) are placed in Lead-in Zone of the inner circumference of the optical disc 2, and the other two locations (DMAs 3 and 4) are deployed into Lead-out Zone of the outer circumference thereof. The layer number of the optical disc, the DMA placement number on each layer, and the distribution to the inner and outer circumferences are not limited thereto. The defect management information is recorded in the DMA. The defect management information includes information (hereinafter referred to as "defect list information") which indicates an alternative recording area at the time when the data is recorded in the alternative recording area, because a defect is present in the original data recording area of the optical disc 2 due to the presence of a scratch, dirt or the like thereon, and, as a result, the data cannot be recorded therein normally. Moreover, the same defect list information is recorded in each of the DMAs 1 to 4 in FIG. 2.

FIG. 3 illustrates a placement example of the defect management information in the optical disc 2 of the present embodiment. In the present embodiment, in a case where five optical discs 2 (discs A to E) are used, the defect management information about the discs A to E is recorded in the DMA of the disc A alone, but the defect management information about the discs A to E is not recorded in the DMAs of the other discs B to E. Namely, the defect management information about the discs A to E is recorded in the DMA 1 of the disc A. Similarly, the defect management information about the discs A to E is also recorded in the DMAs 2 to 4 of the disc A.

Incidentally, in the present embodiment, the defect management information about the discs A to E is recorded in only the disc A, but may similarly be recorded in only the disc B, only the disc C, only the disc D, or only the disc E.

Additionally, in the present embodiment, the five optical discs 2 or the discs A to E are used. As long as the plural optical discs 2 are used, however, the present invention is not limited thereto. Hereinafter, it is assumed that "all of the discs" means the five optical discs 2 or the discs A to E.

Incidentally, in the present embodiment, when storing the discs A to E in the optical disc device 1, the storage places (storage sequence) of the respective discs are not questioned. This makes it possible to reduce the troublesomeness with which the user stores the discs in the optical disc device 1.

Additionally, it may be determined in which of the discs A to E the defect management information should be recorded, by using the storage place of the optical disc 2 in the optical disc device 1. For example, the storage place of the optical disc 2, in which the defect management information should be recorded, may be recorded in the memory 64 in advance.

Hereinafter, referring to FIG. 4 to FIG. 7, the operation of the optical disc device 1 of the present embodiment will be explained concerning the initializing, recording, reproducing, and ejecting processes. In the below explanation, the disc management information includes the defect management information, but may also include the defect management information and the other management information, or be the defect management information itself.

Figure 4:
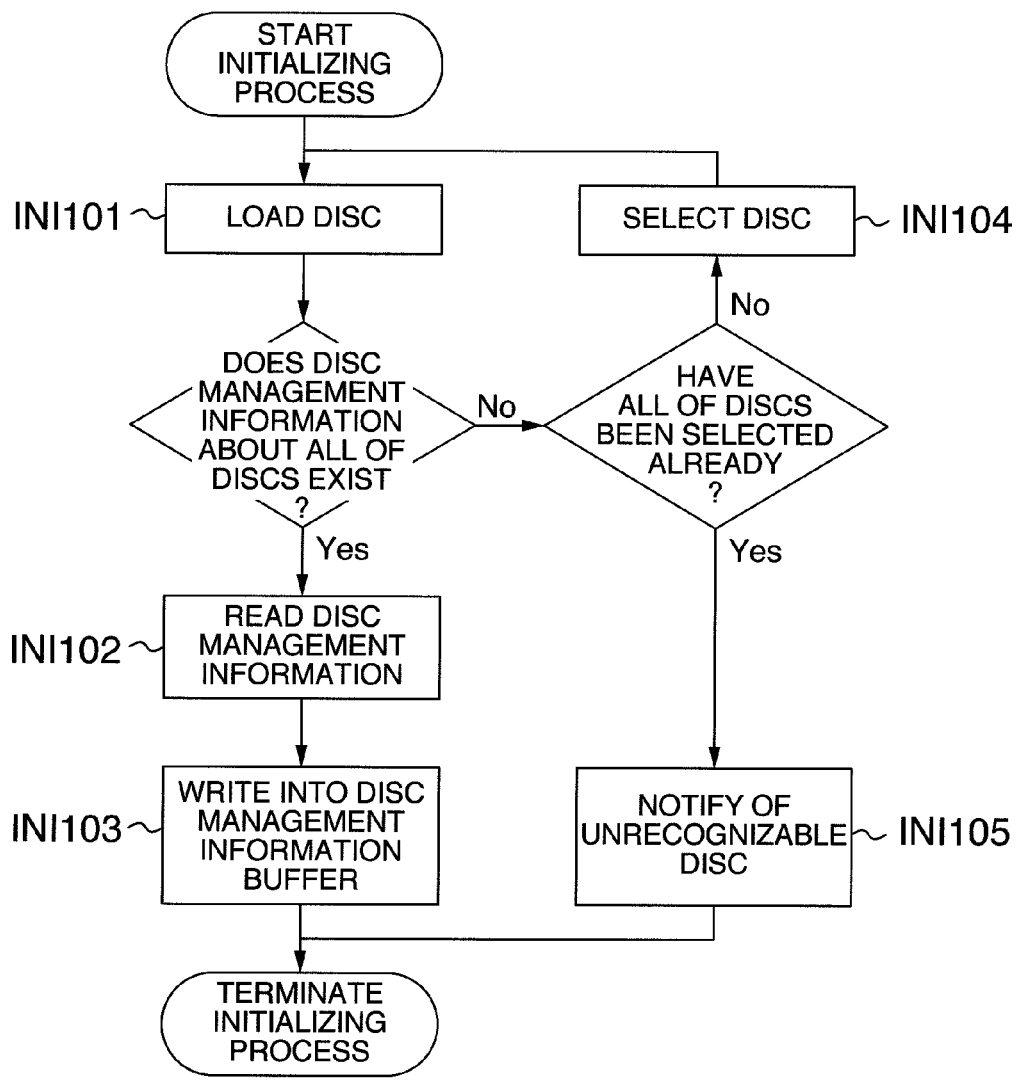
FIG. 4 is a diagram for illustrating an initializing process according to the first embodiment of the present invention.

FIG. 4 illustrates an initializing process according to the present embodiment. The initializing process is started after powering on the optical disc device 1, or with a command from the host PC 8 or setting the optical disc 2 by the user. After the initializing process is started, "Load Disc" INI 101 is performed. At "Load Disc" INI 101, the microcomputer 63 outputs the disc exchange command S10 to the disc exchange section 5. Subsequently, if no optical disc 2 has been loaded, the disc exchange section 5 selects an optical disc 2 among the plural optical discs 2 set in the optical disc device 1 to load the optical disc 2.

When "Load Disc" INI 101 is over, the microcomputer 63 reproduces the DMA of the loaded optical disc 2 to determine whether or not the disc management information about all of the discs exists in the DMA. It is all right to reproduce minimum recorded data to determine whether or not the disc management information about all of the discs exists in the DMA.

When reproducing the DMA of the loaded optical disc 2, the microcomputer 63 controls as described below. The microcomputer 63 issues the motor control command S09 to the motor control section 67. The motor control section 67 outputs the motor control signal S01 to the spindle motor 4 so as to rotate the loaded optical disc 2. After controlling the rotation frequency of the optical disc 2, the microcomputer 63 outputs the position control command S07 to the position control section 65 so as to move the optical pickup 3 to a position at which the DMA data of the loaded optical disc 2 is to be reproduced. Accordingly, the position control section 65 outputs the position control signal S02 to the optical pickup 3 so as to move the optical pickup 3 to the position at which the DMA data is to be reproduced. After moving the optical pickup 3 to the position at which the DMA data is to be reproduced, the microcomputer 63 issues the laser-light control command S08 to the laser-light control section 66 so as to reproduce the DMA data. The laser-light control section 66 outputs the laser-light control signal S03 to the optical pickup 3 at the address position of the DMA of the loaded optical disc 2 to reproduce it. The optical pickup 3 illuminates the loaded optical disc 2 with the laser light, receives the reflected light, and converts this reflected light into the electrical signal S04 to output this electrical signal to the AFE 61 of the signal processing LSI 6. The AFE 61 performs the analog-signal process such as amplification of the electrical signal S04, and generates the analog signal S05 to output this analog signal to the decode section 62. The decode section 62 binarizes the analog signal S05, decodes the binary signal, and generates the decoded result to store this decoded result in the memory 64.

As a result of the determination as to whether or not the disc management information about all of the discs exists in the above DMA, if the disc management information about all of the discs exists therein, "Read Disc Management Information" INI 102 is performed. At "Read Disc Management Information" INI 102, the microcomputer 63 reads the disc management information about all of the discs by performing basically the same operation as the operation of reproducing the DMA of the loaded optical disc 2 to store this read result in the memory 64.

After "Read Disc Management Information" INI 102, "Write into Disc Management Information Buffer" INI 103 is performed. At "Write into Disc Management Information Buffer" INI 103, the microcomputer 63 control reading the disc management information about all of the discs stored in the memory 64 and writing it into the disc management information buffer 7. After "Write into Disc Management Information Buffer" INI 103, the initializing process is terminated.

As a result of the determination as to whether or not the disc management information about all of the discs exists in the above DMA, if the disc management information about all of the discs does not exist therein, it is judged whether or not all of the discs have been already selected and loaded. Then, if there are optical discs 2 which have been set but not yet loaded in the initializing process, "Select Disc" INI 104 is performed.

At "Select Disc" INI 104, an optical disc 2 is selected among the optical discs 2 which have been set but not yet loaded in the initializing process. After "Select Disc" INI 104, the above "Load Disc" INI 101 is performed again.

In the above judgment as to whether or not all of the discs have been already selected and loaded, if all of the discs have been set and loaded in the initializing process, "Notify of Unrecognizable Disc" INI 105 is performed. At "Notify of Unrecognizable Disc" INI 105, it is notified that the disc could not be recognized. The output destination of the notice is a display section not illustrated in FIG. 1, or the host PC 8 via the interface section 68. Otherwise, so that the user can take out optical discs 2, the tray on which optical discs 2 set in the optical disc device 1 are placed is made open or ejected outside. After "Notify of Unrecognizable Disc" INI 105, the initializing process is terminated.

Figure 5:
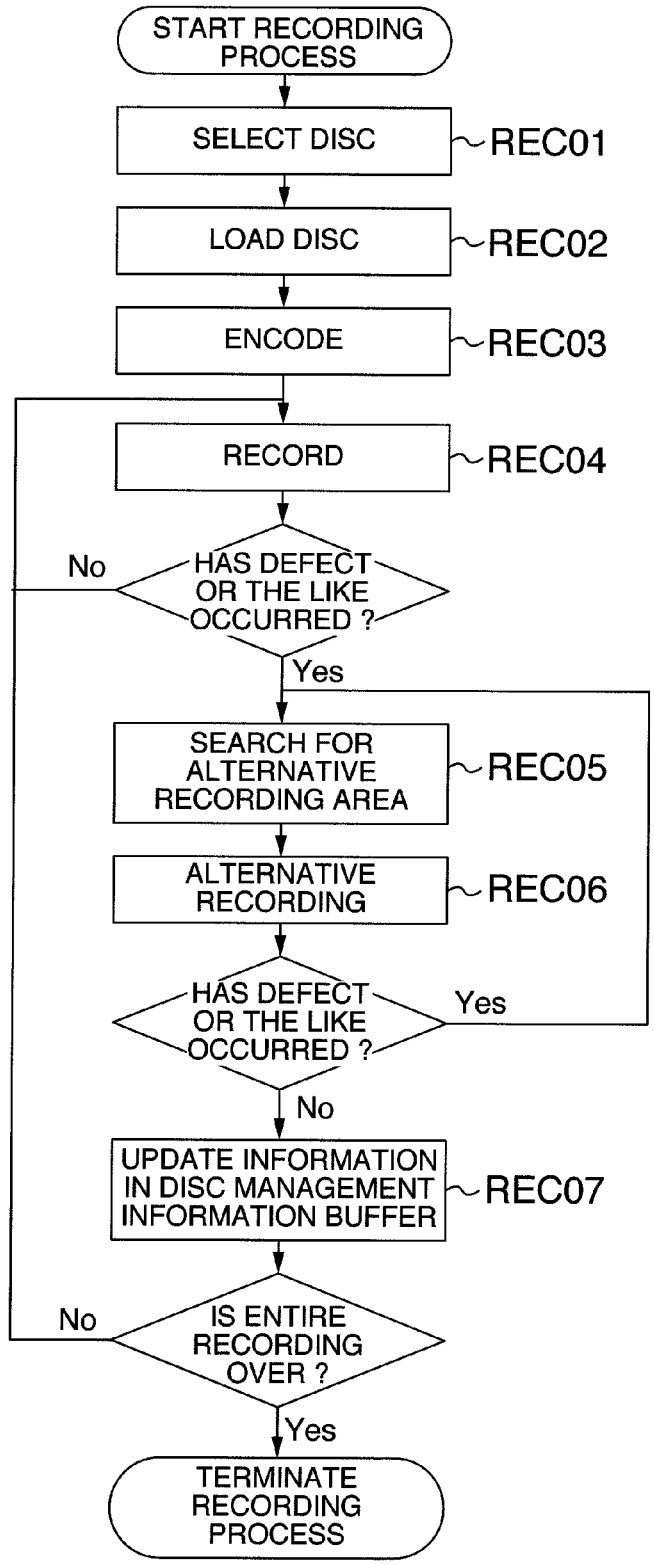
FIG. 5 is a diagram for illustrating a recording process according to the first embodiment of the present invention.

FIG. 5 illustrates the recording process according to the present embodiment. The recording is started with a recording command from the host PC. The recording command from the host PC 8 is communicated via the interface section 68 to be stored in the memory 64. Recorded data is also communicated via the interface section 68 to be stored in the memory 64. Incidentally, after receiving the recording command, the interface section 68 may output an interrupt signal to the microcomputer 63 to notify that the interface section 68 has received the recording command. The microcomputer 63 processes the recording command to recognize record addresses in the optical discs 2.

The microcomputer 63 recognizes the record addresses to, based on the record addresses, select an optical disc 2 to load it ("Select Disc" REC 01).

After "Select Disc" REC 01, "Load Disc" REC 02 is performed. The processing of "Load Disc" REC 02 is similar to the processing at "Load Disc" INI 101 in the initializing process illustrated in FIG. 4. Namely, the microcomputer 63 controls so as to load the optical disc 2 selected at "Select Disc" REC 01.

After "Load Disc" REC 02, "Encode" REC 03 is performed. At "Encode" REC 03, the microcomputer 63 controls the encode section 69 so as to encode the recorded data stored in the memory 64. The encode section 69 performs the modulation processing of the recorded data stored in the memory 64, and converts the recorded data into the binary data in the format used to store data in the optical disc 2 to store the binary data in the memory 64. Incidentally, here, "Encode" REC 03 is performed after "Load Disc" REC 02. "Load Disc" REC 02 and "Encode" REC 03, however, may be exchanged in their processing sequence, or may be performed substantially simultaneously.

After "Encode" REC 03, "Record" REC 04 is performed. At "Record" REC 04, the microcomputer 63 outputs the motor control command S09 to the motor control section 67, and the motor control section 67 outputs the motor control signal S01 to the spindle motor 4 so as to rotate the loaded optical disc 2. After controlling rotating the loaded optical disc 2, the microcomputer 63 outputs the position control command S07 to the position control section 65 so as to control the position of the optical pickup 3 at a record address position on the loaded optical disc 2. Accordingly, the position control section 65 outputs the position control signal S02 to the optical pickup 3 so as to move the optical pickup 3 to the record address position. After moving the optical pickup 3 to the record address position, the microcomputer 63 issues the laser-light control command S08 to the laser-light control section 66 so as to record the data. The laser-light control section 66 outputs the laser-light control signal S03 to the optical pickup 3 to record the data. In this case, the signal S03 is output according to the binary data stored in the memory 64 and recorded by employing the record address position on the loaded optical disc 2 as the starting point.

At "Record" REC 04, if a defect has occurred (or if the microcomputer 63 has judged that there is a possibility that a defect has occurred) in the record due to a cause such as a scratch on the loaded optical disc 2 or malfunction of the recoding laser, "Search Alternative Recording Area" REC 05 is performed. At "Search Alternative Recording Area" REC 05, an unrecorded area in Data Zone illustrated in FIG. 2 is searched for. The alternative recording area is searched for by judging the unrecorded position from the bit-map data indicating the recording/unrecording of the Data Zone which is acquired by reproducing the loaded optical disc 2. Otherwise, the unrecorded portion is searched for by reproducing the alternative recording area provided in a partial area of the optical disc 2 in advance. Otherwise, an address at which the recording is executable may be judged by reproducing address information for indicating up to where the alternative recording area has been used. Namely, any searching methods are available as long as they make it possible to determine the alternatively recordable area in the loaded optical link. Incidentally, the bitmap data and the address information for indicating up to where the alternative recording area have been used may be stored in advance in the memory 64 by reproducing the loaded optical disc 2 at the time of the initializing process or before the recording process.

After "Search Alternative Recording Area" REC 05, "Alternative Recording" REC 06 is performed. At "Alternative Recording" REC 06, the binary data including the data in which the defect has occurred (or the microcomputer 63 has judged that there is the possibility that the defect has occurred) is recorded at the address of the starting point of the alternatively recordable area searched for at "Search Alternative Recording Area" REC 05. The recording method is similar to the recording method at "Record" REC 04 except that the record addresses are different, and the explanation thereof will be omitted here. Moreover, if a defect has occurred again (or if the microcomputer 63 has judged that there is a possibility that a defect has occurred again) at "Alternative Recording" REC 06, "Search Alternative Recording Area" REC 05 is performed again.

Meanwhile, if a defect has not occurred (or if the microcomputer 63 has judged that there is no possibility that a defect has occurred) at "Alternative Recording" REC 06, "Update Information in Disc Management Information Buffer" REC 07 is performed. At "Update Information in Disc Management Information Buffer" REC 07, the defect management information stored in the disc management information buffer 7 is updated as follows. Namely, the defect list information already stored therein, the information on the record address at which the defect has occurred (or the microcomputer 63 has judged that there is the possibility that the defect has occurred) at "Record" REC 04, and the information on the record address at which the alternative recording therefore has been performed, are recorded in the disc management information buffer 7 so as to be included in the above defect list information. After "Update Information in Disc Management Information Buffer" REC 07, the recording is terminated when the entire recording data communicated from the host PC 8 has been recorded in the loaded optical disc 2. If unrecorded data remains, the processing returns to "Record" REC 04, at which the unrecorded data is recorded.

Figure 6:
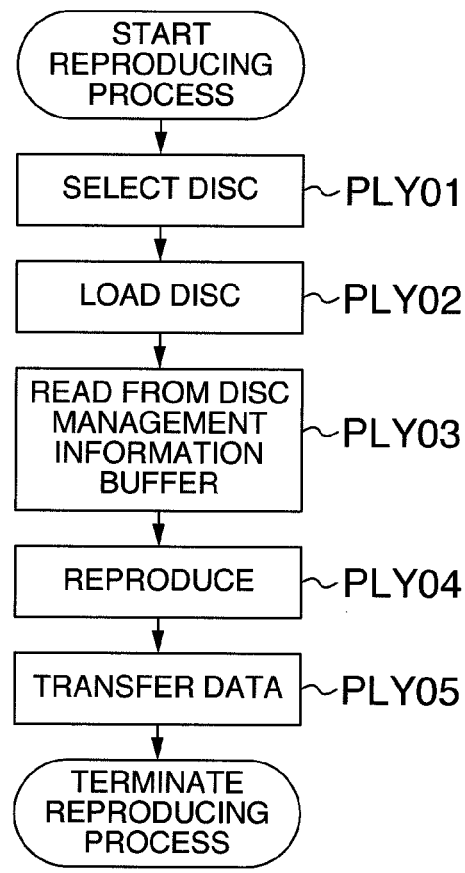
FIG. 6 is a diagram for illustrating a reproducing process according to the first embodiment of the present invention.

FIG. 6 illustrates the reproducing process according to the present embodiment. The reproducing process is started with a reproduction command from the host PC 8. The reproduction command from the host PC 8 is communicated via the interface section 68 to be stored in the memory 64. After receiving the reproduction command, the interface section 68 may output an interrupt signal to the microcomputer 63 to notify the microcomputer 63 that the interface section 68 has received the reproduction command. The microcomputer 63 processes the reproduction command to recognize reproduction addresses in the optical discs 2.

The microcomputer 63 recognizes the reproduction addresses to, based on the reproduction addresses, select an optical disc 2 to be loaded ("Select Disc" PLY 01).

After "Select Disc" PLY 01, "Load Disc" PLY 02 is performed. The processing at "Load Disc" PLY 02 is similar to the processing at "Load Disc" INI 101 in the initializing process illustrated in FIG. 4. Namely, the microcomputer 63 controls so as to load the optical disc 2 selected at "Select Disc" PLY 01.

After "Load Disc" PLY 02, "Read From Disc Management Information Buffer" PLY 03 is performed. At "Read From Disc Management Information Buffer" PLY 03, the microcomputer 63 reads the disc management information about the loaded optical disc 2 from the disc management information buffer 7 to store it in the memory 64. The disc management information to be read from the disc management information buffer 7 may be at least the entire defect management information about the loaded optical disc 2, but the overall disc management information thereabout may not be read.

After "Read From Disc Management Information Buffer" PLY 03, "Reproduce" PLY 04 is performed. The operation at "Reproduce" PLY 04 is similar to the operation in the case where the address of the position at which the DMA data of the loaded optical disc 2 is to be reproduced at "Read Disc Management Information" INI 102 in the initializing process illustrated in FIG. 4 is changed into the above reproduction address, and thus the explanation thereof will be omitted here.

After "Reproduce" PLY 04, "Transfer Data" PLY 05 is performed. At "Transfer Data" PLY 05, the microcomputer 63 performs the control so as to transfer the decoded result stored in the memory 64 at "Reproduce" PLY 04 to the host PC 8 via the interface section 68. After "Transfer Data" PLY 05, the reproducing process is terminated.

Figures 7, 8:
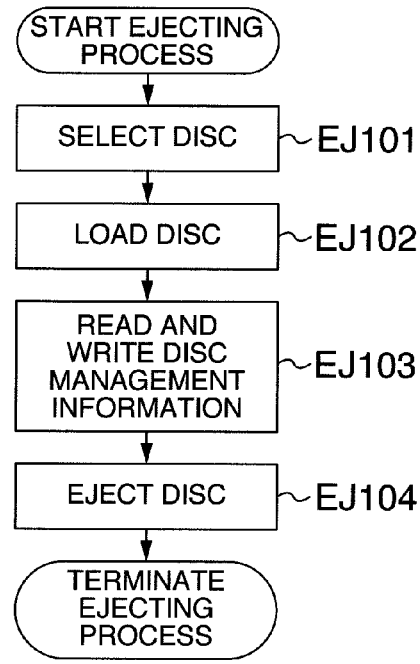
FIG. 7 is a diagram for illustrating an ejecting process according to the first embodiment of the present invention.
FIG. 8 is a diagram for illustrating a placement example 2 of the defect management information according to the second embodiment of the present invention.

FIG. 7 illustrates the ejecting (disc) process according to the present embodiment. The ejecting process is started with a command from the host PC 8 or an operation by user's pushing down an Eject button, etc. of the optical disc device 1. After the ejecting process is started, "Select Disc" EJ 101 is performed. At "Select Disc" EJ 101, the microcomputer 63 selects, as an optical disc to be loaded, the optical disc 2 (the disc A in the present embodiment) in which the disc management information about all of the discs are recorded.

After "Select Disc" EJ 101, "Load Disc" EJ 102 is performed. At "Load Disc" EJ 102, the microcomputer 63 outputs the disc exchange command S10 to the disc exchange section 5 so as to load the optical disc 2 selected at "Select Disc" EJ 101. The disc exchange section 5 receives the disc exchange command S10 to load the optical disc 2 selected at "Select Disc" EJ 101.

After "Load Disc" EJ 102, "Read and Write Disc Management Information" EJ 103 is performed. At "Read and Write Disc Management Information" EJ 103, the microcomputer 63 reads the disc management information about all of the discs A to E stored in the disc management information buffer 7, and controls the encode section 69 so as to encode it. Then, the encode section 69 encodes the disc management information to generate the binary data and record it at the four locations of the DMAs 1 to 4 of the loaded optical disc 2 in accordance with the processing similar to recording the recorded data ("Record" REC 04 in FIG. 5). At this time, the defect list information is the same data at the respective four locations of the DMAs 1 to 4. If, however, the data to be recorded at the respective four locations differs from each other as to the other data of the disc management information, the microcomputer 63 controls the encode section 69 so as to encode the data accordingly to generate the binary data and record it in the DMA of the loaded optical disc 2.

After "Read and Write Disc Management Information" EJ 103, "Eject Disc" EJ 104 is performed. At "Eject Disc" EJ 104, so that the user can take out the optical disc 2, the tray on which the optical disc 2 set in the optical disc device 1 is placed is made open or ejected outside. When "Eject Disc" EJ 104 is over, the ejecting process is terminated.

As explained above, at normal times, the disc management information about optical discs are stored in a nonvolatile recording medium such as flash memory or SSD, and, at the time of ejecting an optical disc, the disc management information about the optical discs stored in the nonvolatile recording medium is written into the optical disc. This makes it possible to manage the management information about the plural optical discs efficiently without writing the disc management information into the optical disc every time a defect occurs in the record.

Second Embodiment

Next, a second embodiment will be explained. A configuration example of the optical disc device 1 in the second embodiment is illustrated in FIG. 1 as with the first embodiment. Also, the placement of the DMA in the optical disc 2 in the second embodiment is similar to the placement in the first embodiment illustrated in FIG. 2.

FIG. 8 illustrates a placement example of the defect management information in the optical disc 2 of the present embodiment. In the present embodiment, in the case where the five optical discs 2 (discs A to E) are used, the defect management information about the discs A to E are recorded in all of the discs A to E.

Additionally, in the present embodiment, the five optical discs 2 or the discs A to E are used. As long as the plural optical discs 2 are used, however, the present invention is not limited thereto.

Figure 9:
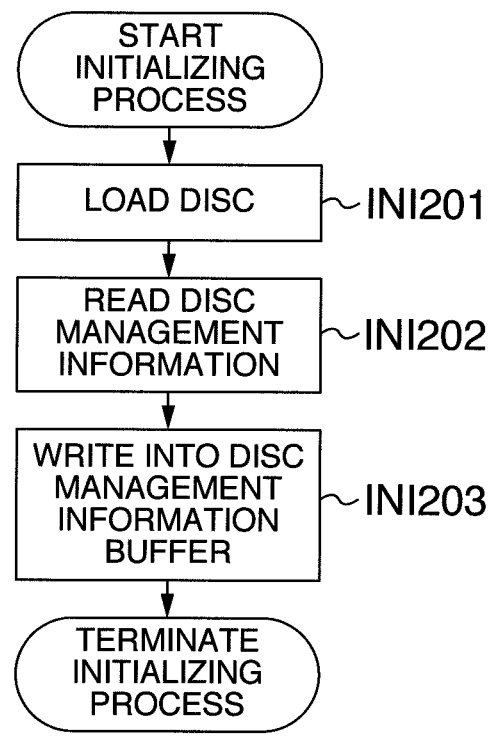
FIG. 9 is a diagram for illustrating an initializing process according to the second embodiment of the present invention.
Figure 10:
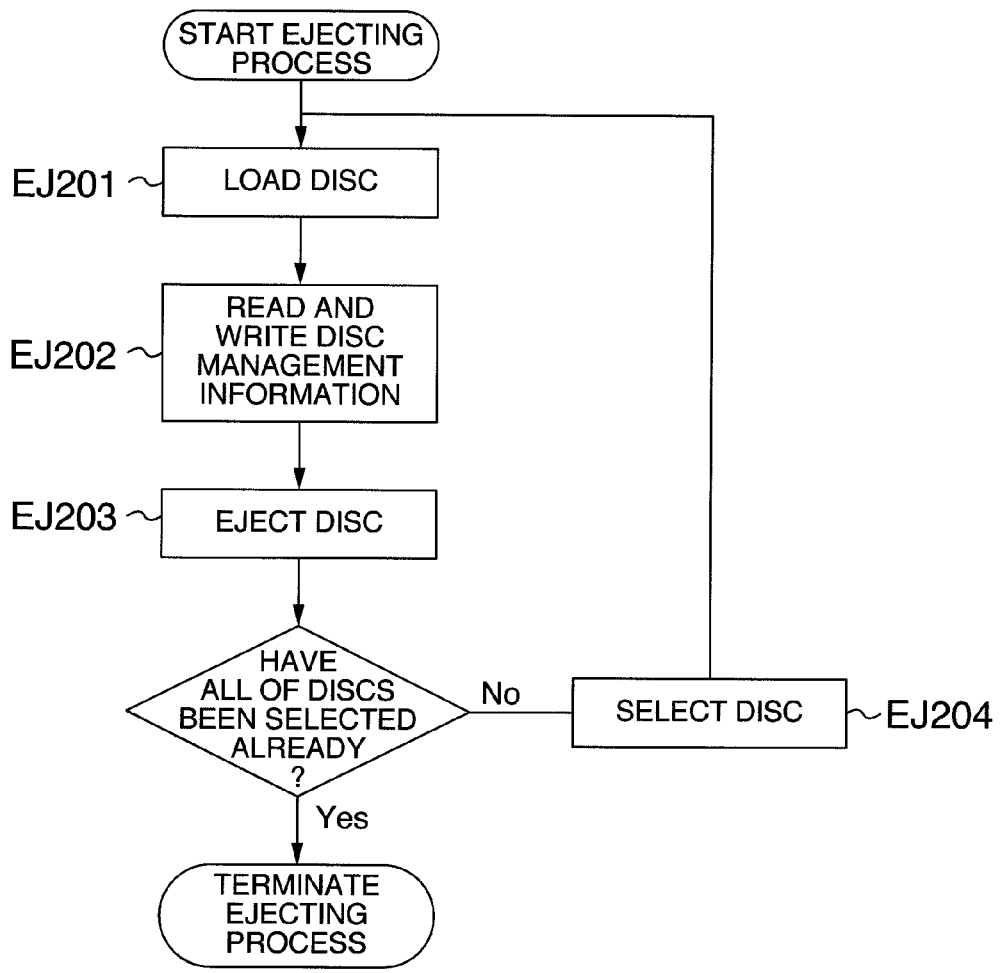
FIG. 10 is a diagram for illustrating an ejecting process according to the second embodiment of the present invention.

Referring to FIG. 9 and FIG. 10, the initializing and ejecting processes will be explained as to the operation of the optical disc device 1 of the present embodiment. Incidentally, the recording and reproducing processes are similar to the processes in the first embodiment, and thus the explanation thereof will be omitted here.

FIG. 9 illustrates the initializing process according to the present embodiment. The initializing process is started after powering on the optical disc device 1, or with receiving a command from the host PC 8 or setting the optical disc 2 by the user. After the initializing process is started, "Load Disc" INI 201 is performed. The operation at "Load Disc" INI 201 is similar to the operation at "Load Disc" INI 101 in the initializing process of the first embodiment illustrated in FIG. 4, and thus the explanation thereof will be omitted here.

After "Load Disc" INI 201, "Read Disc Management Information" INT 202 is performed. The operation at "Read Disc Management Information" INI 202 is similar to the operation at "Read Disc Management Information" INI 102 in the initializing process of the first embodiment illustrated in FIG. 4, and thus the explanation thereof will be omitted here.

After "Read Disc Management Information" INI 202, "Write into Disc Management Information Buffer" INI 203 is performed. The operation at "Write into Disc Management Information Buffer" INI 203 is similar to the operation at "Write into Disc Management Information Buffer" INI 103 in the initializing process of the first embodiment illustrated in FIG. 4, and thus the explanation thereof will be omitted here.

FIG. 10 illustrates the ejecting (disc) process according to the present embodiment. The ejecting process is started with a command from the host PC 8 or an operation by user's pushing down an Eject button of the optical disc device, etc. After the ejecting process is started, "Load Disc" EJ 201 is performed. At "Load Disc" EJ 201, the microcomputer 63 outputs the disc exchange command S10 to the disc exchange section 5. If "Load Disc" EJ 201 is performed at first, "Read and Write Disc Management Information" EJ 202 is performed without exchanging the already-loaded optical disc 2. The microcomputer 63 outputs the disc exchange command S10 to the disc exchange section 5 so as to load an optical disc 2 selected by the microcomputer 63 at "Select Disc" EJ 204 described later.

After "Load Disc" EJ 201, "Read and Write Disc Management Information" EJ 202 is performed. The operation at "Read and Write Disc Management Information" EJ 202 is similar to the operation at "Read and Write Disc Management Information" EJ 103 in the ejecting process of the first embodiment illustrated in FIG. 7, and thus the explanation thereof will be omitted here.

After "Read and Write Disc Management Information" EJ 202, "Eject Disc" EJ 203 is performed. The operation at "Eject Disc" EJ 203 is similar to the operation at "Eject Disc" EJ 104 in the ejecting process of the first embodiment illustrated in FIG. 7, and thus the explanation thereof will be omitted here.

After "Eject Disc" EJ 203, the microcomputer 63 judges whether or not "Read and Write Disc Management Information" has been performed with respect to all of the optical discs 2. If the microcomputer 63 judges that "Read and Write Disc Management Information" has been performed with respect to all of the optical discs 2, the microcomputer 63 terminates the ejecting process, but, if not, the microcomputer 63 performs "Select Disc" EJ 204.

At "Select Disc" EJ 204, the microcomputer 63 selects an optical disc 2 among the set optical discs 2 with respect to which "Read and Write Disc Management Information" has been not yet performed in the ejecting process. After "Select Disc" EJ 204, the microcomputer 63 performs "Load Disc" EJ 201 again.

As explained above in the present embodiment as well the first embodiment, at normal times, the disc management information about optical discs are stored in a nonvolatile recording medium such as flash memory or SSD, and, at the time of ejecting an optical disc, the disc management information is written into the optical disc. This allows managing the management information about the plural optical discs efficiently without writing the disc management information into the optical disc every time a defect occurs in the record.

Also, at the time of ejecting an optical disc, the disc management information about all of the optical discs is written into the optical disc. This makes it unnecessary to load the optical discs 2 one by one at the time of initialization. Consequently, it becomes possible to shorten even further a processing time needed at the time of initialization.

Third Embodiment

Next, a third embodiment will be explained. A configuration example of the optical disc device 1 in the third embodiment is illustrated in FIG. 1 as with the first embodiment.

Also, the placement of the DMA of the optical disc 2 in the third embodiment is similar to the placement in the first embodiment illustrated in FIG. 2.

FIG. 11 illustrates a placement example of the defect management information in the optical disc 2 of the present embodiment. In the present embodiment where the five optical discs 2 (discs A to E) are used, the defect management information about the disc A, the defect management information about the disc B, the defect management information about the disc C, the defect management information about the disc D, and the defect management information about the disc E are recorded in the disc E, the disc A, the disc B, the disc C, and the disc D, respectively.

Additionally, in the present embodiment, the five optical discs 2 or the discs A to E are used. As long as the plural optical discs 2 are used, however the present invention is not limited thereto.

Also, as described above, the defect management information about the disc A, the defect management information about the disc B, the defect management information about the disc C, the defect management information about the disc D, and the defect management information about the disc E are recorded in the disc E, the disc A, the disc B, the disc C, and the disc D, respectively. As long as the defect management information about a certain optical disc 2 is recorded in another optical disc 2, however, the combination of defect management information and an optical disc 2 in which the defect management information is to be recorded, is not limited thereto. For example, the defect management information about the disc A, the defect management information about the disc B, the defect management information about the disc C, the defect management information about the disc D, and the defect management information about the disc E may be recorded in the disc B, the disc C, the disc D, the disc E, and the disc A, respectively.

Figure 12:
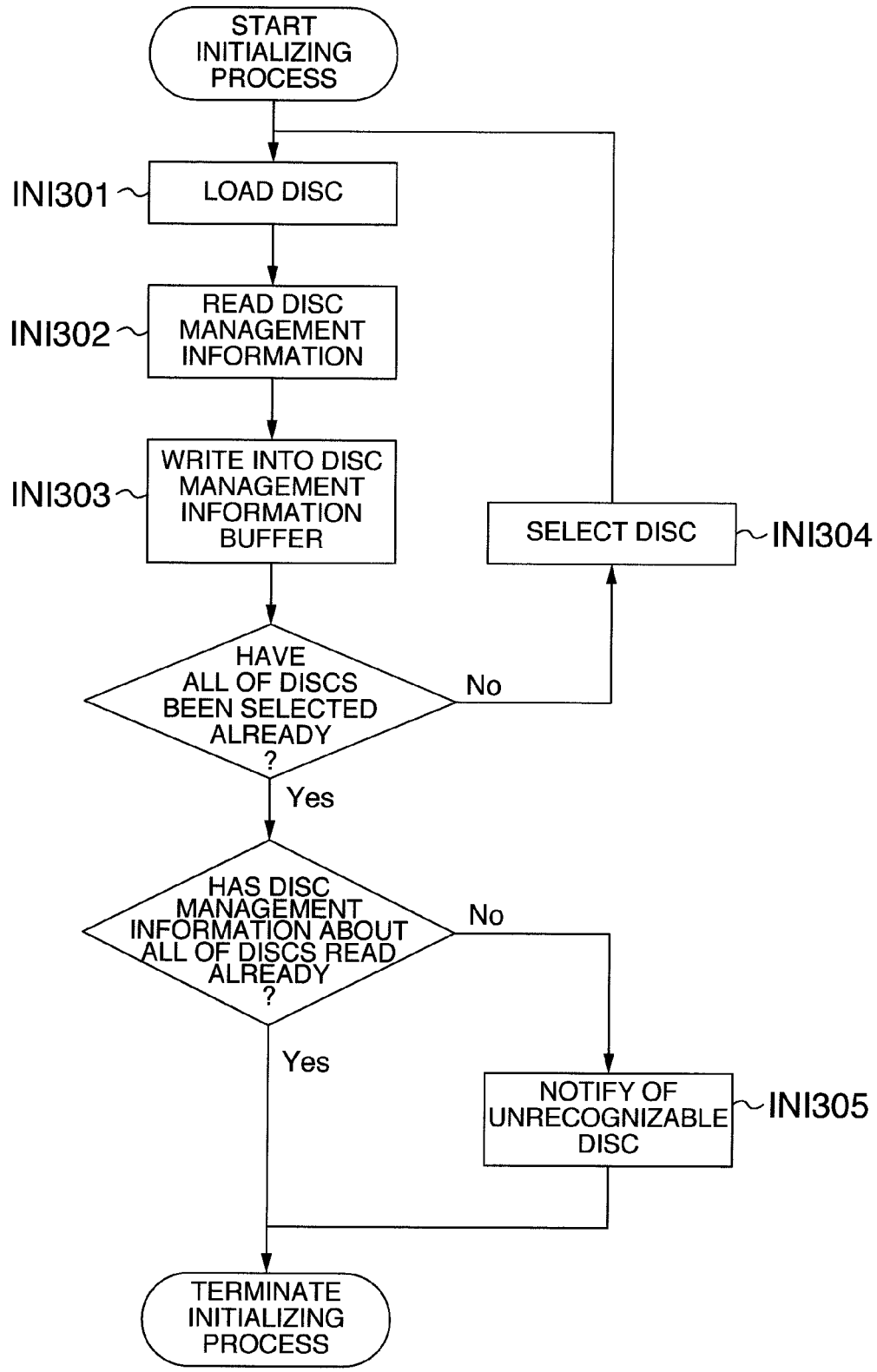
FIG. 12 is a diagram for illustrating an initializing process according to the third embodiment of the present invention.
Figure 13:
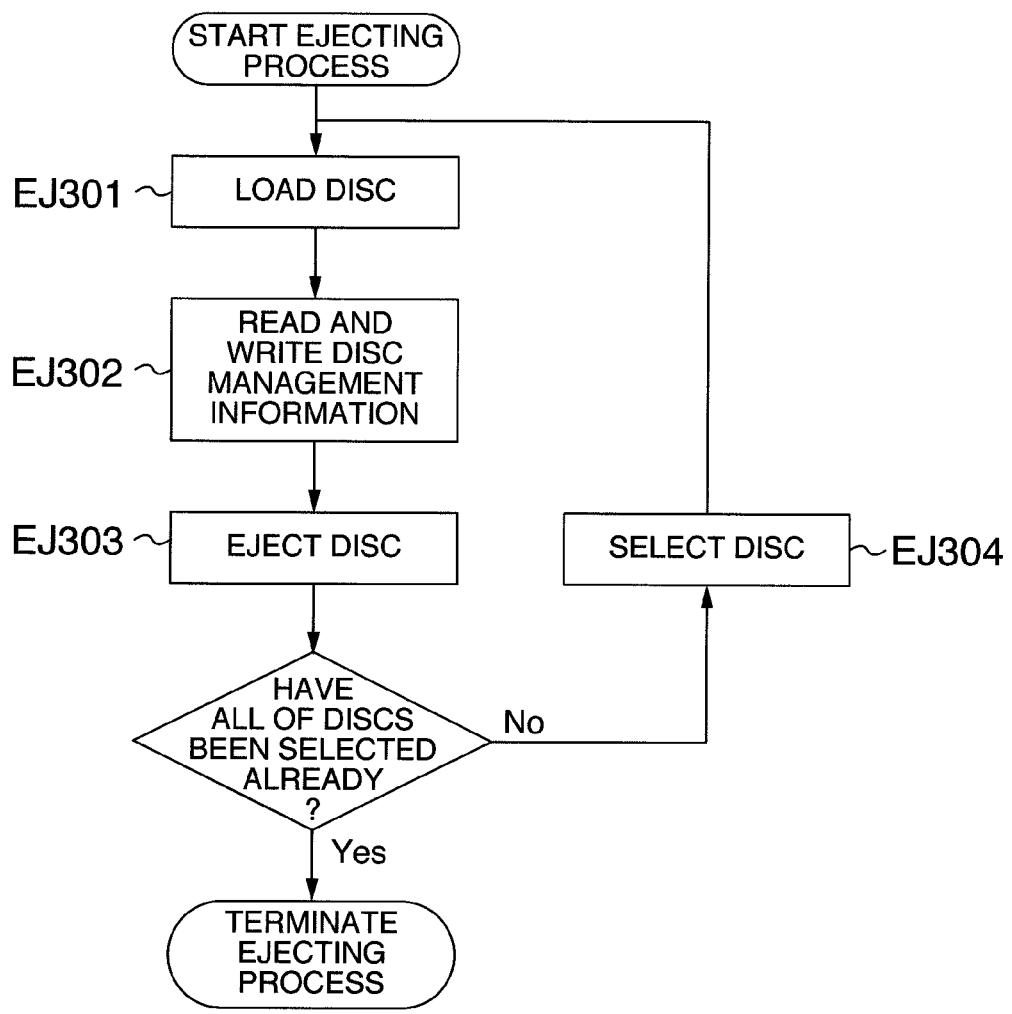
FIG. 13 is a diagram for illustrating an ejecting process according to the third embodiment of the present invention.

Referring to FIG. 12 and FIG. 13, the initializing and ejecting processes will be explained as to the operation of the optical disc device 1 of the present embodiment. Incidentally, the recording and reproducing processes are similar to the processes in the first embodiment, and thus the explanation thereof will be omitted here.

FIG. 12 illustrates an initializing process according to the present embodiment. The initialization process is started after powering on the optical disc device 1, or with receiving a command from the host PC 8 or setting the optical disc 2 by the user. After the initialization process is started, "Load Disc" INI 301 is performed. The operation at "Load Disc" INI 301 is similar to the operation at "Load Disc" INI 101 in the initializing process of the first embodiment illustrated in FIG. 4, and thus the explanation thereof will be omitted here.

After "Load Disc" INI 301, "Read Disc Management Information" INI 302 is performed. The operation at "Read Disc Management Information" INI 302 is similar to the operation at "Read Disc Management Information" INI 102 in the initializing process of the first embodiment illustrated in FIG. 4, and thus the explanation thereof will be omitted here. However, the present embodiment differs from the first embodiment in that, at "Read Disc Management Information" INI 302 in the present embodiment, the disc management information about one optical disc 2 is read from a certain optical disc 2, but the disc management information about all of the optical discs 2 is not read differently from the first embodiment.

After "Read Disc Management Information" INI 302, "Write into Disc Management Information Buffer" INI 303 is performed. The operation at "Write into Disc Management Information Buffer" INI 303 is similar to the operation at "Write into Disc Management Information Buffer" INI 103 in the initializing process of the first embodiment illustrated in FIG. 4, and thus the explanation thereof will be omitted here. However, the present embodiment differs from the first embodiment in that, at "Write into Disc Management Information Buffer" INT 303 in the present embodiment, the disc management information about the one optical disc 2 is written into the disc management information buffer 7, but the disc management information about all of the optical discs 2 is not written differently from the first embodiment.

After "Write into Disc Management Information Buffer" INT 303, the microcomputer 63 judges whether or not all of the optical discs 2 have been selected and the disc management information about all of the optical discs 2 have been already read. Then, if the microcomputer 63 has judged that all of the optical discs have been selected, the microcomputer 63 judges whether or not the disc management information about all of the optical discs have been already read. If the microcomputer 63 has judged that the disc management information about all of the optical discs has been already read, the microcomputer 63 terminates the initializing process.

If the microcomputer 63 has judged that all of the optical discs 2 has not been selected and the disc management information thereabout have been not read, the microcomputer 63 performs "Select Disc" INI 304. The operation at "Select Disc" INI 304 is similar to the operation at "Select Disc" INI 104 in the initializing process of the first embodiment illustrated in FIG. 4, and thus the explanation thereof will be omitted here. After "Select Disc" INI 304, the microcomputer 63 performs "Load Disc" INI 301 again.

If the microcomputer 63 has not judged that the disc management information about all of the optical discs have been already read, the microcomputer 63 performs "Notify of Unrecognizable Disc" INI 305 described later. The operation at "Notify of Unrecognizable Disc" INI 305 is similar to the operation at "Notify of Unrecognizable Disc" INT 105 in the initializing process of the first embodiment illustrated in FIG. 4, and thus the explanation thereof will be omitted here.

FIG. 13 illustrates the ejecting (disc) process according to the present embodiment. The ejecting process is started with a command from the host PC 8, or an operation by user's pushing down an Eject button of the optical disc device. After the ejecting process is started, "Load Disc" EJ 301 is performed. The operation at "Load Disc" EJ 301 is similar to the operation at "Load Disc" EJ 201 in the ejecting process of the second embodiment illustrated in FIG. 10, and thus the explanation thereof will be omitted here.

After "Load Disc" EJ 301, "Read and Write Disc Management Information" EJ 302 is performed. The operation at "Read and Write Disc Management Information" EJ 302 is similar to the operation at "Read and Write Disc Management Information" EJ 103 in the ejecting process of the first embodiment illustrated in FIG. 7, and thus the explanation thereof will be omitted here. However, the present embodiment differs from the first embodiment in that, at "Read and Write Disc Management Information" EJ 302 in the present embodiment, the disc management information about one not-loaded optical disc 2 is read from the disc management information buffer 7 and written into the optical disc, but the disc management information about all of the optical discs 2 is not read and written differently from the first embodiment.

After "Read and Write Disc Management Information" EJ 302, "Eject Disc" EJ 303 is performed. The operation at "Eject Disc" EJ 303 is similar to the operation at "Eject Disc" EJ 104 in the ejecting process of the first embodiment illustrated in FIG. 7, and thus the explanation thereof will be omitted here.

After "Eject Disc" EJ 303, the microcomputer 63 judges whether or not "Read and Write Disc Management Information" has been performed with respect to all of the optical discs 2. If the microcomputer 63 has judged that "Read and Write Disc Management Information" has been performed with respect to all of the optical discs, the microcomputer 63 terminates the ejecting process, but, if not, the microcomputer 63 performs "Select Disc" EJ 304.

The operation at "Select Disc" EJ 304 is similar to the operation at "Select Disc" EJ 204 in the ejecting process of the second embodiment illustrated in FIG. 10, and thus the explanation thereof will be omitted here. After "Select Disc" EJ 304, the microcomputer 63 performs "Load Disc" EJ 301 again.

As explained above, in the present embodiment as with the first embodiment, at normal times, the disc management information about optical discs are stored in a nonvolatile recording medium such as flash memory or SSD, and, at the time of ejecting an optical disc, the disc management information is written into the optical disc. This allows managing the management information about the plural optical discs efficiently without writing the disc management information into the optical disc every time a defect occurs in the record.

Also, recording the defect management information about a certain optical disc 2 in another optical disc 2 allows enhancing confidentiality of the recorded information and reducing the risk of a security accident.

Fourth Embodiment

Next, a fourth embodiment will be explained. A configuration example of the optical disc device 1 in the fourth embodiment is illustrated in FIG. 1 as with the first embodiment. Also, the placement of the DMA in the optical disc 2 in the fourth embodiment is similar to the placement in the first embodiment illustrated in FIG. 2. Also, a placement example of the defect management information in the fourth embodiment is illustrated in FIG. 3 as with the first embodiment.

Additionally, in the present embodiment, the five optical discs 2 or the discs A to E are used as with the first embodiment. As long as the plural optical discs 2 are used, however, the present invention is not limited thereto.

The present embodiment differs from the first embodiment in that authentication is executed at the time of initialization with respect to the plural optical discs 2 by utilizing the identification information unique to the respective optical discs 2 and combination information (authentication information) on the plural optical discs. FIG. 18 illustrates the authentication information in the present embodiment, and the authentication information is composed of the disc IDs of the plural optical discs 2. The authentication information illustrated in FIG. 18 is just an example. As long as the authentication information includes the disc IDs of the plural optical discs 2, the format the authentication information is not limited to this example's format. The authentication allows preventing from reproducing erroneous data, when the user has set the mistakenly combined plural optical discs 2. Also, this allows informing the user of the error immediately, even if the user has set the mistakenly combined plural optical discs 2. Also, if the combination of the plural optical discs 2 is mismatched, the initializing process cannot be completed normally. This allows enhancing confidentiality of the recorded information and reducing the risk of a security accident.

Incidentally, in the present embodiment, it is assumed that the authentication information is recorded in an optical disc 2 in which the disc management information about all of the optical disc 2 set in the optical disc device 1 is recorded.

Incidentally, in the present embodiment, when storing the discs A to E in the optical disc device 1, the storage places (storage sequence) of the respective discs are not questioned. This allows reducing the troublesomeness when the user stores the discs in the optical disc device 1.

Figure 14:
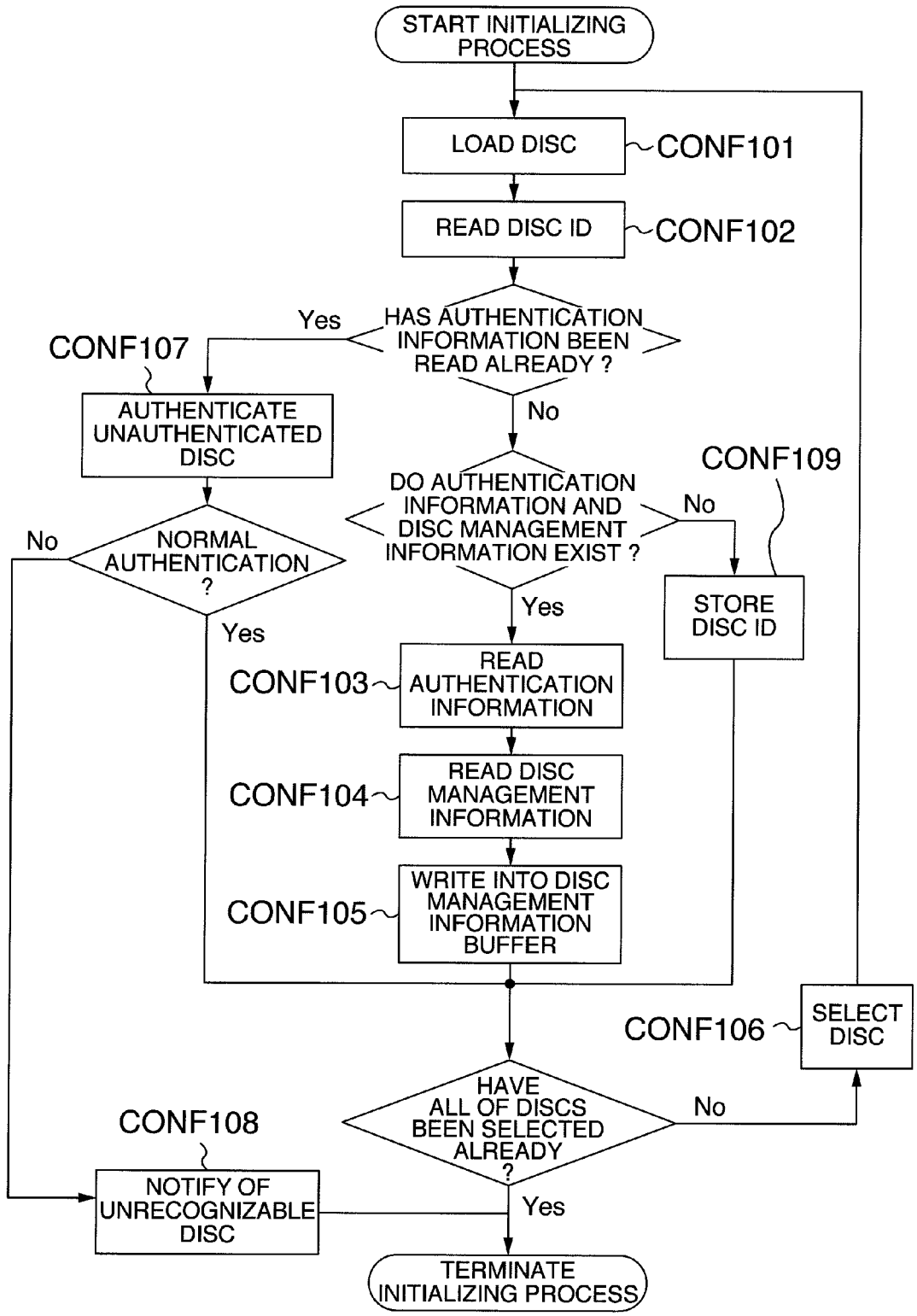
FIG. 14 is a diagram for illustrating an initializing process according to the fourth embodiment of the present invention.

Referring to FIG. 14, the initializing process will be explained as to the operation of the optical disc device 1 of the present embodiment. Incidentally, the recording, reproducing, and ejecting processes are similar to the processes in the first embodiment, and thus the explanation thereof will be omitted here.

FIG. 14 illustrates the initializing process according to the present embodiment. The initializing process is started after powering on the optical disc device 1, or with receiving a command from the host PC 8 or setting the optical disc 2 by the user. After the initialization process is started, "Load Disc" CONF 101 is performed. The operation at "Load Disc" CONF 101 is similar to the operation at "Load Disc" INI 101 in the initializing process of the first embodiment illustrated in FIG. 4, and thus the explanation thereof will be omitted here.

Figure 15:
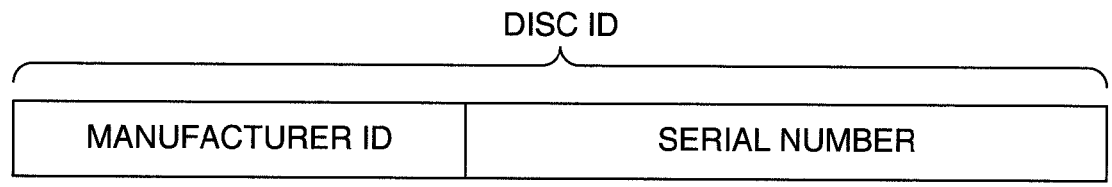
FIG. 15 is a diagram for illustrating an example of the disc ID according to the fourth to sixth embodiments of the present invention.
Figure 23:
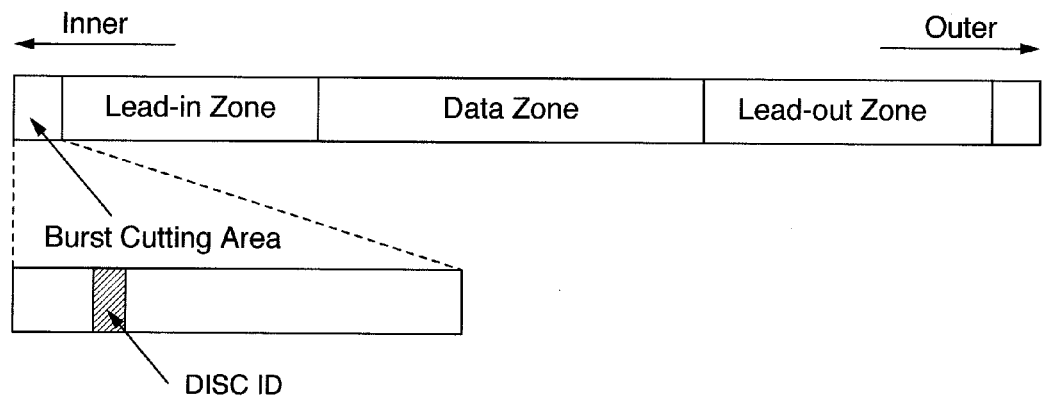
FIG. 23 is a diagram for illustrating a placement example of the disc ID according to the fourth to sixth embodiments of the present invention.

After "Load Disc" CONF 101, "Read Disc ID" CONF 102 is performed. At "Read Disc-ID" CONF 102, the disc ID in advance recorded in the optical disc 2 by its optical-disc maker is read by reproduction. The disc ID is the identification information allocated to optical discs 2 individually. For example, in the case of the BD, the disc ID is recorded in a BCA (Burst Cutting Area) as illustrated in FIG. 23. FIG. 15 is a diagram for illustrating an example of the disc ID, which includes a manufacturer ID for identifying its optical-disc maker, and a serial number which is different for each optical disc.

Additionally, it may also be determined, based on the authentication information, in which disc of the discs A to E the defect management information should be recorded. For example, the manufacturer ID for identifying the maker an optical-disc that should record the defect management information is recorded in advance in the memory 64. Then, if the optical disc that has this manufacturer ID is set up in the optical disc device 1, the defect management information is recorded in this optical disc. Also, priority level may be allocated to the disc IDs, depending on the degrees of reliability of optical-disc makers. If the optical discs whose reliability are equal to each other are set up in the optical disc device 1, it may be determined, based on the storage place in the optical disc device 1, in which disc the defect management information should be recorded. This allows managing the management information recorded in the optical discs 2 efficiently.

The reproduction operation of the disc ID of the loaded optical disc 2 is similar to the operation at "Read Disc Management Information" INI 102 in the initializing process of the first embodiment illustrated in FIG. 4, and thus the explanation thereof will be omitted here. However, the reproducing position on the reproduced optical disc 2 is the position at which the disc ID is recorded, which differs from the reproducing position in the first embodiment.

Figure 24:
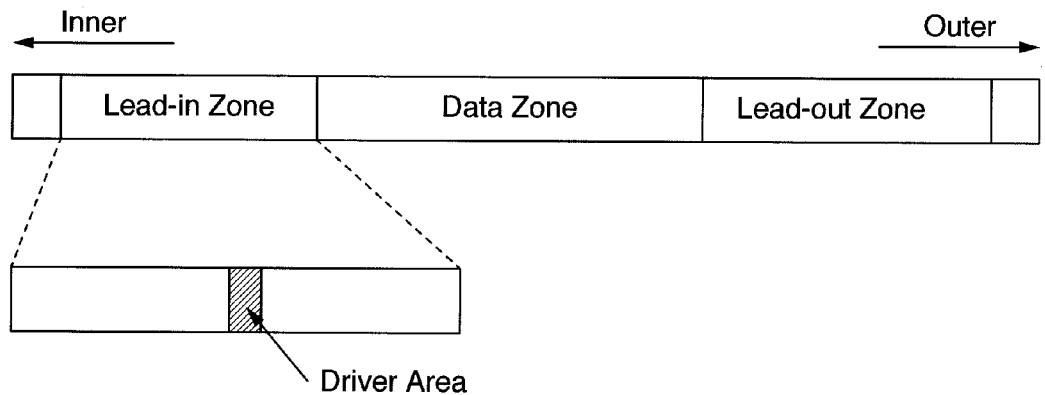
FIG. 24 is a diagram for illustrating a placement example of the authentication information according to the fourth to sixth embodiments of the present invention.

After "Read Disc-ID" CONF 102, the microcomputer 63 judges whether or not the authentication information has been already read from another optical disc 2. If the microcomputer 63 has judged that the authentication information has been not yet read from another optical disc 2, the microcomputer 63 judges whether or not the authentication information and the disc management information exist in the loaded optical disc 2, by reproducing the loaded optical disc 2. The reproduction operation is similar to the operation at "Read Disc Management Information" INI 102 in the initializing process of the first embodiment illustrated in FIG. 4, and thus the explanation thereof will be omitted here. However, the present embodiment differs from the first embodiment in that, the reproducing position in the present embodiment is a position at which the authentication information is recorded, or a position at which flag information for indicating that the authentication information exists in the optical disc 2 is recorded. For example, the position at which the authentication information or the flag information is recorded is in a Drive Area as illustrated in FIG. 24. The Drive Area is an area where the recording optical disc device 1 can determine the data format independently to record or reproduce the information. Incidentally, instead of judging whether or not the authentication information and the disc management information exist in the loaded optical disc 2, it may be judged whether or not either of the authentication information and the disc management information exists therein.

If the microcomputer 63 has judged that the authentication information and the disc management information exist in the loaded optical disc 2, the microcomputer 63 performs "Read Authentication Information" CONF 103. The operation at "Read Authentication Information" CONF 103 is similar to the operation at "Read Disc Management Information" INI 102 in the initializing process of the first embodiment illustrated in FIG. 4, and thus the explanation thereof will be omitted here. However, the present embodiment differs from the first embodiment in that, the reproducing position in the present embodiment is the position at which the authentication information is recorded.

After "Read Authentication Information" CONF 103, "Read Disc Management Information" CONF 104 is performed. The operation at "Read Disc Management Information" CONF 104 is similar to the operation at "Read Disc Management Information" INI 102 in the initializing process of the first embodiment illustrated in FIG. 4, and thus the explanation thereof will be omitted here.

After "Read Disc Management Information" CONF 104, "Write into Disc Management Information Buffer" CONF 105 is performed. The operation at "Write into Disc Management Information Buffer" CONF 105 is similar to the operation at "Write into Disc Management Information Buffer" INI 103 in the initializing process of the first embodiment illustrated in FIG. 4, and thus the explanation thereof will be omitted here.

After "Write into Disc Management Information Buffer" CONF 105, the microcomputer 63 judges whether or not all of the optical discs 2 set in the optical disc device 1 have been selected and loaded. If the microcomputer 63 has judged that all of the optical discs 2 set in the optical disc device 1 have been selected and loaded, the microcomputer 63 terminates the initializing process. If the microcomputer 63 has judged that all of the optical discs 2 set in the optical disc device 1 have been not selected and loaded, the microcomputer 63 performs "Select Disc" CONF 106. The operation at "Select Disc" CONF 106 is similar to the operation at "Select Disc" INI 104 in the initializing process of the first embodiment illustrated in FIG. 4, and thus the explanation thereof will be omitted here. After "Select Disc" CONF 106, the microcomputer 63 performs "Load Disc" CONF 101 again.

After "Read Disc-ID" CONF 102, if the microcomputer 63 has judged that the authentication information has been already read from another optical disc 2, the microcomputer 63 performs "Authenticate Unauthtenticated Disc" CONF 107. At "Authenticate Unauthtenticated Disc" CONF 107, the microcomputer 63 confirms whether or not the disc ID of the loaded optical disc 2 or the information for indicating that the disc ID is included therein, has been included in the already-read authentication information. Also, if a disc ID exists which has been stored in the memory 64 at "Store Disc ID" CONF 109 described later, then the microcomputer 63 confirms with respect to this disc ID as well.

In the confirmation at "Authenticate Unauthtenticated Disc" CONF 107, if the microcomputer 63 has judged that the disc ID of the loaded optical disc 2 or the information for indicating that the disc ID is included therein, has been included in the already-read authentication information, then the microcomputer 63 regards this authentication as a normal authentication, and performs the above judgment as to whether or not all of the optical discs 2 set in the optical disc device 1 have been selected and loaded.

In the confirmation at "Authenticate Unauthtenticated Disc" CONF 107, if the microcomputer 63 has judged that the disc ID of the loaded optical disc 2 or the information for indicating that the disc ID is included therein, has been not included in the already-read authentication information, then the microcomputer 63 performs "Notify of Unrecognizable Disc" CONF 108. The operation at "Notify of Unrecognizable Disc" CONF 108 is similar to the operation at "Notify of Unrecognizable Disc" INI 105 in the initializing process of the first embodiment illustrated in FIG. 4, and thus the explanation thereof will be omitted here.

In the above judgment as to whether or not the authentication information and the disc management information exist in the loaded optical disc 2, if the microcomputer 63 has judged that the authentication information and the disc management information do not exist in the loaded optical disc 2, the microcomputer 63 performs the above "Store Disc ID" CONF 109. At "Store Disc ID" CONF 109, the microcomputer 63 stores the disc ID of the loaded optical disc 2 in the memory 64.

As explained above, at normal times, the disc management information about optical discs are stored in a nonvolatile recording medium such as flash memory or SSD, and, at the time of ejecting an optical disc, the disc management information are written into the optical disc. This method allows managing the management information about the plural optical discs efficiently without writing the disc management information into the optical disc every time a defect occurs in the record. Furthermore, with respect to the plural optical discs 2, the identification information unique to the respective optical discs 2 is utilized. This allows enhancing confidentiality of the recorded information and reducing the risk of a security accident.

Fifth Embodiment

Next, a fifth embodiment will be explained. A configuration example of the optical disc device 1 in the fifth embodiment is illustrated in FIG. 1 as with the first embodiment. Also, the placement of the DMA in the optical disc 2 in the fifth embodiment is similar to the placement in the first embodiment illustrated in FIG. 2. Also, a placement example of the defect management information in the fifth embodiment is illustrated in FIG. 8 as with the second embodiment.

Additionally, in the present embodiment, the five optical discs 2 or the discs A to E are used as with the first embodiment. As long as the plural optical discs 2 are used, however, the present invention is not limited thereto.

The present embodiment differs from the second embodiment in that the authentication is executed at the time of initialization with respect to the plural optical discs 2 by utilizing the identification information unique to the respective optical discs 2 and generating the combination information on the plural optical discs 2. This allows obtaining effects similar to the fourth embodiment's effects.

Incidentally, in the present embodiment, it is assumed that the authentication information is recorded in an optical disc 2, in which the disc management information about all of the optical discs 2 set in the optical disc device 1 is recorded.

Figure 16:
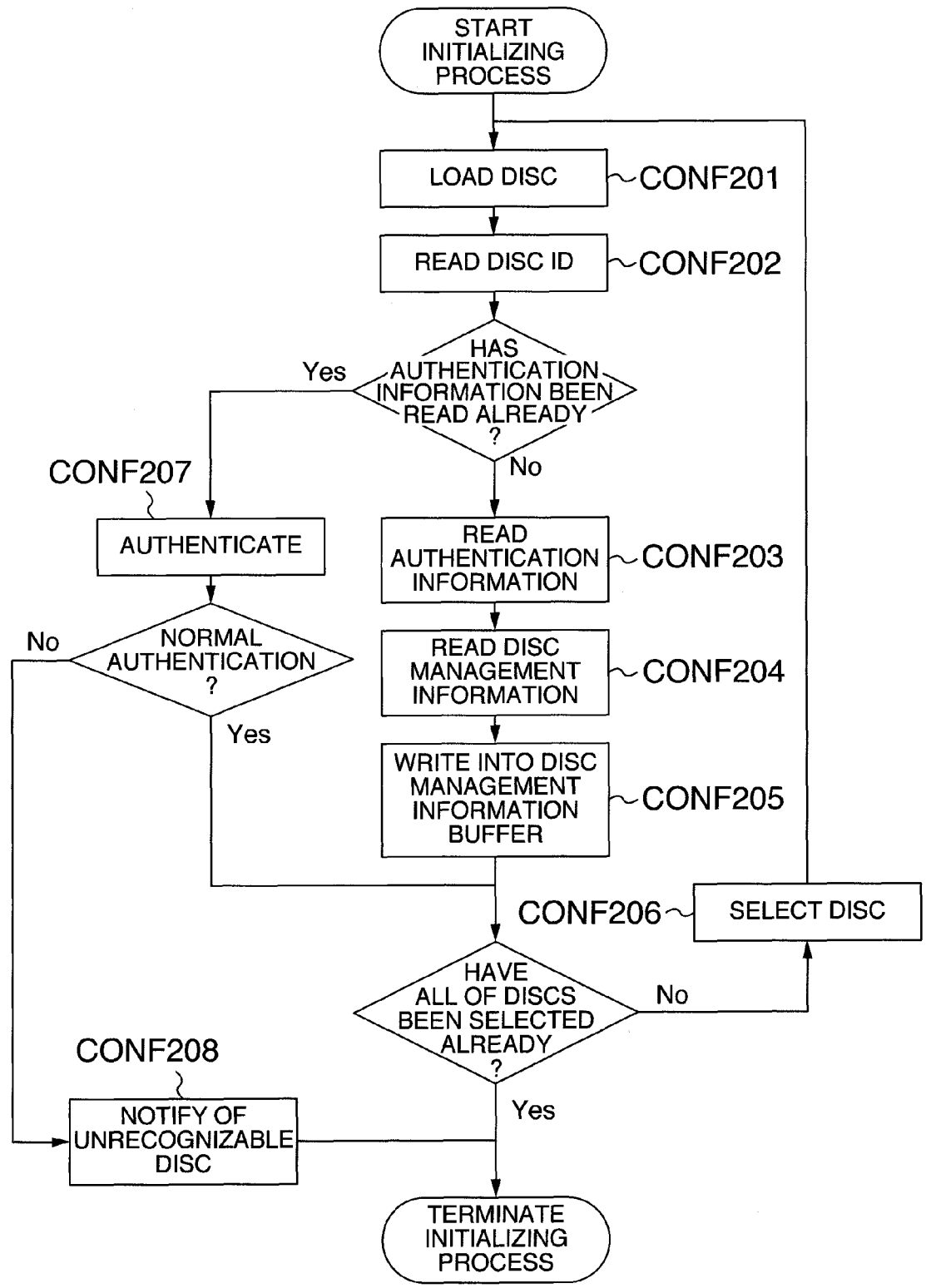
FIG. 16 is a diagram for illustrating an initializing process according to the fifth embodiment of the present invention.

Referring to FIG. 16, the initializing process will be explained as to the operation of the optical disc device 1 of the present embodiment. Incidentally, the recording, reproducing, and ejecting processes are similar to the processes in the second embodiment, and thus the explanation thereof will be omitted here.

FIG. 16 illustrates the initializing process according to the present embodiment. The initialization process is started after powering on the optical disc device 1, or with receiving a command from the host PC 8 or setting the optical disc 2 by the user. After the initialization process is started, "Load Disc" CONF 201 is performed. The operation at "Load Disc" CONF 201 is similar to the operation at "Load Disc" INT 101 in the initializing process of the first embodiment illustrated in FIG. 4, and thus the explanation thereof will be omitted here.

After "Load Disc" CONF 201, "Read Disc ID" CONF 202 is performed. The operation at "Read Disc-ID" CONF 202 is similar to the operation at "Read Disc-ID" CONF 102 in the initializing process of the fourth embodiment illustrated in FIG. 14, and thus the explanation thereof will be omitted here.

After "Read Disc-ID" CONF 202, the microcomputer 63 judges whether or not the authentication information has been already read from another optical disc 2. If the microcomputer 63 has judged that the authentication information has been not yet read from another optical disc 2, the microcomputer 63 performs "Read Authentication Information" CONF 203. The operation at "Read Authentication Information" CONF 203 is similar to the operation at "Read Authentication Information" CONF 103 in the initializing process of the fourth embodiment illustrated in FIG. 14, and thus the explanation thereof will be omitted here.

After "Read Authentication Information" CONF 203, "Read Disc Management Information" CONF 204 is performed. The operation at "Read Disc Management Information" CONF 204 is similar to the operation at "Read Disc Management Information" INI 102 in the initializing process of the first embodiment illustrated in FIG. 4, and thus the explanation thereof will be omitted here.

After "Read Disc Management Information" CONF 204, "Write into Disc Management Information Buffer" CONF 205 is performed. The operation at "Write into Disc Management Information Buffer" CONF 205 is similar to the operation at "Write into Disc Management Information Buffer" INI 103 in the initializing process of the first embodiment illustrated in FIG. 4, and thus the explanation thereof will be omitted here.

After "Write into Disc Management Information Buffer" CONF 205, the microcomputer 63 judges whether or not all of the optical discs 2 set in the optical disc device 1 have been selected and loaded. If the microcomputer 63 has judged that all of the optical discs 2 set in the optical disc device 1 have been selected and loaded, the microcomputer 63 terminates the initializing process. If the microcomputer 63 has judged that all of the optical discs 2 set in the optical disc device 1 have been not selected and loaded, the microcomputer 63 performs "Select Disc" CONF 206. The operation at "Select Disc" CONF 206 is similar to the operation at "Select Disc"

INT 104 in the initializing process of the first embodiment illustrated in FIG. 4, and thus the explanation thereof will be omitted here. After "Select Disc" CONF 206, the microcomputer 63 performs "Load Disc" CONF 201 again.

After "Read Disc-ID" CONF 202, if the microcomputer 63 has judged that the authentication information has been already read from another optical disc 2, the microcomputer 63 performs "Authenticate" CONF 207. At "Authenticate" CONF 207, the microcomputer 63 confirms whether or not the disc ID of the loaded optical disc 2 or the information for indicating that the disc ID is included therein, has been included in the already-read authentication information.

In the confirmation at "Authenticate" CONF 207, if the microcomputer 63 has judged that the disc ID of the loaded optical disc 2 or the information for indicating that the disc ID is included therein, has been included in the already-read authentication information, the microcomputer 63 regards this authentication as a normal authentication, and performs the above judgment as to whether or not all of the optical discs 2 set in the optical disc device 1 have been selected and loaded.

Meanwhile, in the confirmation at "Authenticate" CONF 207, if the microcomputer 63 has judged that the disc ID of the loaded optical disc 2 or the information for indicating that the disc ID is included therein, has been not included in the already-read authentication information, the microcomputer 63 performs "Notify of Unrecognizable Disc" CONF 208. The operation at "Notify of Unrecognizable Disc" CONF 208 is similar to the operation at "Notify of Unrecognizable Disc" INI 105 in the initializing process of the first embodiment illustrated in FIG. 4, and thus the explanation thereof will be omitted here.

As explained above, at normal times, the disc management information about optical discs are stored in a nonvolatile recording medium such as flash memory or SSD, and, at the time of ejecting an optical disc, the disc management information is written into the optical disc. This allows managing the management information about the plural optical discs efficiently without writing the disc management information into the optical disc every time a defect occurs in the record.

Also, at the time of ejecting an optical disc, the disc management information about all of the optical discs is written into the optical disc. This makes it unnecessary to load the optical discs 2 one by one at the time of initialization. Consequently, it becomes possible to shorten even further a processing time needed at the time of initialization.

Furthermore, with respect to the plural optical discs 2, the identification information unique to the respective optical discs 2 is utilized. This allows enhancing confidentiality of the recorded information and reducing the risk of a security accident.

Sixth Embodiment

Next, a sixth embodiment will be explained. A configuration example of the optical disc device 1 in the sixth embodiment is illustrated in FIG. 1 as with the first embodiment. Also, the placement of the DMA in the optical disc 2 in the sixth embodiment is similar to the placement in the first embodiment illustrated in FIG. 2. Also, a placement example of the defect management information in the sixth embodiment is also illustrated in FIG. 11 as with the third embodiment.

Additionally, in the present embodiment, the five optical discs 2 or the discs A to E are used as with the first embodiment. As long as the plural optical discs are used, however, the present invention is not limited thereto.

Also, as with the third embodiment, the defect management information about the disc A, the defect management information about the disc B, the defect management information about the disc C, the defect management information about the disc D, and the defect management information about the disc E are recorded in the disc E, the disc A, the disc B, the disc C, and the disc D, respectively, but the combination of defect management information and an optical disc 2 in which the defect management information is to be recorded is not limited thereto, as long as the defect management information about a certain optical disc 2 is recorded in another optical disc 2. For example, the defect management information about the disc A, the defect management information about the disc B, the defect management information about the disc C, the defect management information about the disc D, and the defect management information about the disc E may be recorded in the disc B, the disc C, the disc D, the disc E, and the disc A, respectively.

The present embodiment differs from the third embodiment in that the authentication is executed at the time of initialization with respect to the plural optical discs 2 by utilizing the identification information unique to the respective optical discs 2 and generating the combination information on the plural optical discs 2. This allows obtaining effects similar to the fourth embodiments' effects.

Incidentally, in the present embodiment, it is assumed that the authentication information is recorded in an optical disc 2, in which the disc management information about an optical disc 2 set in the optical disc device 1 is recorded.

Figure 17:
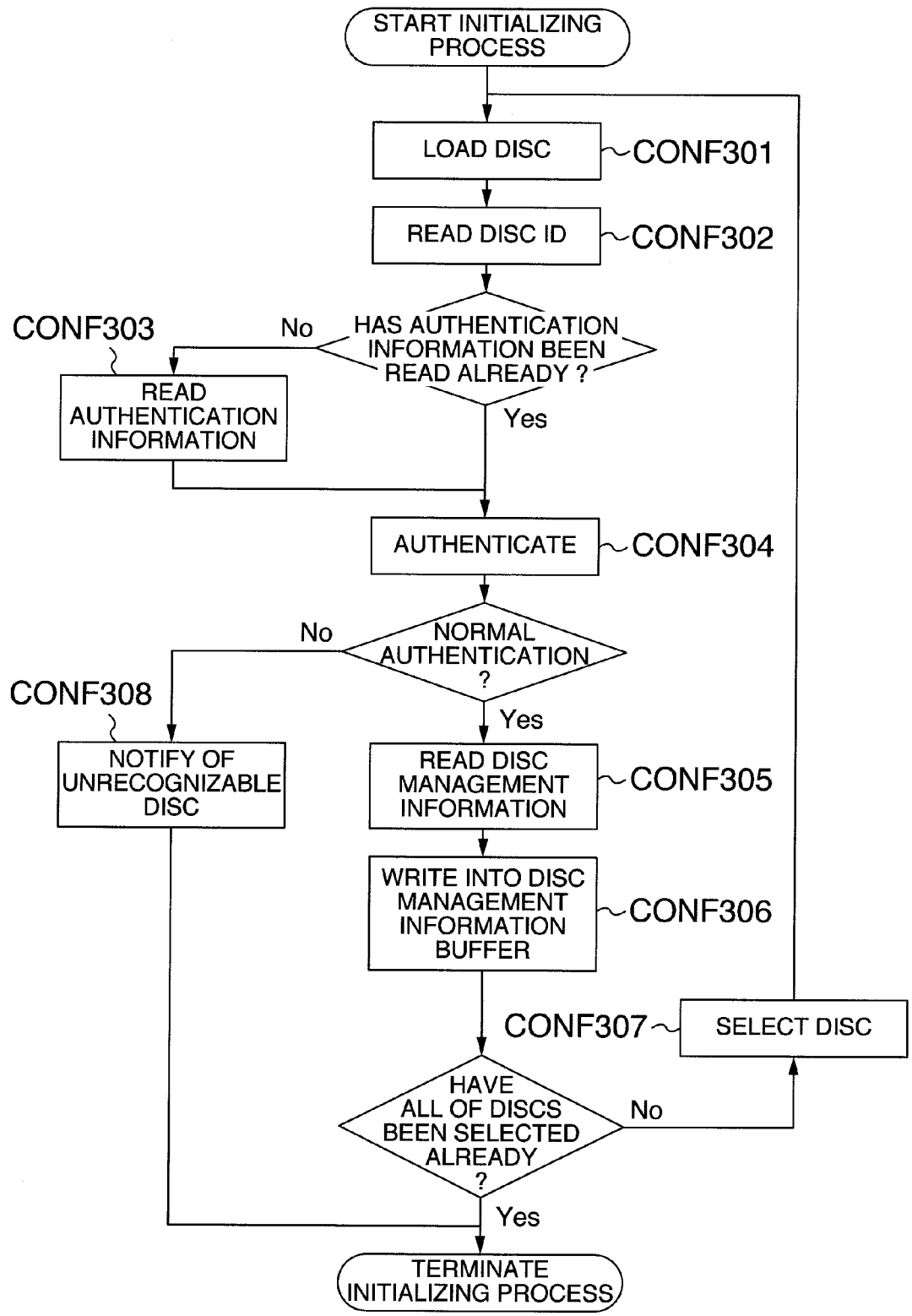
FIG. 17 is a diagram for illustrating an initializing process according to the sixth embodiment of the present invention.

Referring to FIG. 17, the initializing process will be explained as to the operation of the optical disc device 1 of the present embodiment. Incidentally, the recording, reproducing, and ejecting processes are similar to the processes in the third embodiment, and thus the explanation thereof will be omitted here.

FIG. 17 illustrates the initializing process according to the present embodiment. The initialization process is started after powering on the optical disc device 1, or with receiving a command from the host PC 8 or setting the optical disc 2 by the user. After the initialization process is started, "Load Disc" CONF 301 is performed. The operation at "Load Disc" CONF 301 is similar to the operation at "Load Disc" INI 101 in the initializing process of the first embodiment illustrated in FIG. 4, and thus the explanation thereof will be omitted here.

After "Load Disc" CONF 301, "Read Disc ID" CONF 302 is performed. The operation at "Read Disc-ID" CONF 302 is similar to the operation at "Read Disc-ID" CONF 102 in the initializing process of the fourth embodiment illustrated in FIG. 14, and thus the explanation thereof will be omitted here.

After "Read Disc-ID" CONF 302, the microcomputer 63 judges whether or not the authentication information has been already read from another optical disc 2. If the microcomputer 63 has judged that the authentication information has been not yet read from another optical disc 2, the microcomputer 63 performs "Read Authentication Information" CONF 303. The operation at "Read Authentication Information" CONF 303 is similar to the operation at "Read Authentication Information" CONF 103 in the initializing process of the fourth embodiment illustrated in FIG. 14, and thus the explanation thereof will be omitted here.

After "Read Authentication Information" CONF 303, the microcomputer 63 performs "Authenticate" CONF 304. The operation at "Authenticate" CONF 304 is similar to the operation at "Authenticate" CONF 207 in the initializing process of the fifth embodiment illustrated in FIG. 16, and thus the explanation thereof will be omitted here. Also, in judging whether or not the authentication information has been already read from another optical disc 2, if the microcomputer 63 has judged that the authentication information has been already read from another optical disc 2, the microcomputer 63 also performs the above "Authenticate" CONF 304.

In the confirmation at "Authenticate" CONF 304, if the microcomputer 63 has judged that the disc ID of the loaded optical disc 2 or the information for indicating that the disc ID is included therein, has been not included, the microcomputer 63 performs "Notify of Unrecognizable Disc" CONF 308. The operation at "Notify of Unrecognizable Disc" CONF 308 is similar to the operation at INI 105 in the initializing process of the first embodiment illustrated in FIG. 4, and thus the explanation thereof will be omitted here.

In the confirmation at "Authenticate" CONF 304, if the microcomputer 63 has judged that the disc ID of the optical disc 2 or the information for indicating that the disc ID is included therein, has been included the microcomputer 63 regards this authentication as a normal authentication and performs "Read Disc Management Information" CONF 305. The operation at "Read Disc Management Information" CONF 305 is similar to the operation at "Read Disc Management Information" INI 102 in the initializing process of the first embodiment illustrated in FIG. 4, and thus the explanation thereof will be omitted here. However, the present embodiment differs from the first embodiment in that, at the CONF 305 in the present embodiment, the disc management information about one optical disc 2 is read, but the disc management information about all of the optical discs 2 is not read from an optical disc 2 differently from the first embodiment.

After "Read Disc Management Information" CONF 305, "Write into Disc Management Information Buffer" CONF 306 is performed. The operation at "Write into Disc Management Information Buffer" CONF 306 is similar to the operation at "Write into Disc Management Information Buffer" INT 103 in the initializing process of the first embodiment illustrated in FIG. 4, and thus the explanation thereof will be omitted here. However, the present embodiment differs from the first embodiment in that, at the CONF 306 in the present embodiment, the disc management information about one optical disc 2 is written into the disc management information buffer 7, but the disc management information about all of the optical discs 2 is not written differently from the first embodiment.

After "Write into Disc Management Information Buffer" CONF 306, the microcomputer 63 judges whether or not all of the optical discs 2 set in the optical disc device 1 have been selected and loaded. If the microcomputer 63 has judged that all of the optical discs 2 set in the optical disc device 1 have been selected and loaded, the microcomputer 63 terminates the initializing process. If the microcomputer 63 has judged that all of the optical discs 2 set in the optical disc device 1 have been not selected and loaded, the microcomputer 63 performs "Select Disc" CONF 307. The operation at "Select Disc" CONF 307 is similar to the operation at "Select Disc" INI 104 in the initializing process of the first embodiment illustrated in FIG. 4, and thus the explanation thereof will be omitted here. After "Select Disc" CONF 307, the microcomputer 63 performs "Load Disc" CONF 301 again.

As explained above, at normal times, the disc management information about optical discs are stored in a nonvolatile recording medium such as flash memory or SSD, and, at the time of ejecting an optical disc, the disc management information is written into the optical disc. This allows managing the management information about the plural optical discs efficiently without writing the disc management information into the optical disc every time a defect occurs in the record.

Also, recording the defect management information about a certain optical disc in another optical disc allows enhancing confidentiality of the recorded information and reducing the risk of a security accident.

Furthermore, utilizing the identification information unique to the respective optical discs 2 allows enhancing confidentiality of the recorded information and reducing the risk of a security accident.

Incidentally, during initialization of the first to sixth embodiments, it is judged whether or not all of the optical discs 2 set in the optical disc device 1 are unrecorded discs. If all of the optical discs 2 set in the optical disc device 1 are unrecorded discs, initialization may be terminated.

Also, in the first to sixth embodiments, at the time of ejection, the disc management information in the disc management information buffer 7 are recorded in the optical disc. However, when the command data from the host PC 8 has been not received for a constant time and there is a spare time in the processing time of the optical disc device 1, the disc management information may be recorded in the disc. Otherwise, when the command data has been sent from the host PC 8 so that the optical disc device 1 can be got in a sleep state such as power-saving mode, the information may be recorded in the disc. Otherwise, when the disc in which the disc management information is to be recorded is loaded, or before the disc is disc-exchanged with another disc, the information may be recorded therein so that a significant influence can be not exerted on the record or reproduction performance of the optical disc.

Also, in the first to fourth embodiments, the disc management information about the discs A to E is recorded in only any one optical disc among the discs A to E. The disc management information about the discs A to E, however, may be recorded in plural optical discs. Recording the information in the plural optical discs allows enhancing an information-deficiency-resistant property against the information deficiency, because some other disc may be reproduced and read even if the disc management information has failed in recording in one optical disc or even if the recorded data of the disc management information has been damaged.

Also, in the first to fourth embodiments, the disc exchange is performed in order to retrieve the disc in which the entire disc management information about the discs A to E is recorded. The place where the disc is to be stored in the optical disc device, however, may be predetermined. In this case, the disc exchange in accompaniment with the above retrieval becomes unnecessary, and thus it becomes possible to shorten further the time needed for initialization.

Also, in the fourth embodiment, it is assumed that the authentication information is recorded in an optical disc 2 in which the disc management information about all of the discs set in the optical disc device 1 are recorded. The authentication information, however, need not necessarily be recorded in the optical disc 2 in which the disc management information are recorded, and the disc management information may also be recorded in another disc. In this case, "Read Authentication Information" CONF 103 and "Read Disc Management Information" CONF 104 are not performed continuously, but are performed separately with respect to different discs 2.

Also, in the fifth embodiment, it is assumed that the authentication information is recorded in the optical disc 2 in which the disc management information about all of the discs set in the optical disc device 1 are recorded. The authentication information, however, need not necessarily be recorded in the optical disc 2 in which the disc management information are recorded, and, in some optical discs 2, the authentication information may not be recorded. In this case, "Read Authentication Information" CONF 203 and "Read Disc Management Information" CONF 204 may not be performed continuously so that "Read Authentication Information" CONF 203 can be skipped.

Also, in the sixth embodiment, it is assumed that the authentication information is recorded in an optical disc 2 in which the disc management information about an optical disc 2 set in the optical disc device 1 is recorded. The authentication information, however, need not necessarily be recorded in the optical disc 2 in which the disc management information is recorded, and, in some optical discs 2, the authentication information may not be recorded. In this case, "Read Authentication Information" CONF 203 and "Read Disc Management Information" CONF 204 may not be performed continuously so that "Read Authentication Information" CONF 203 can be skipped.

Also, in the fourth to sixth embodiments, it is assumed that the authentication information is recorded in the optical disc 2. The authentication information, however, may also be recorded in a nonvolatile memory such as the memory 64 of the signal processing LSI 6 or the disc management information buffer 7 of the optical disc device 1. In this case, at "Read Authentication Information" in the fourth to sixth embodiments are performed not from the optical disc 2 but from the nonvolatile memory such as the memory 64 or the disc management information buffer 7.

Also, in the fourth to sixth embodiments, it is assumed that the disc ID has the manufacturer ID and the serial number. The disc ID may also has medium-type information such as BD-R (BD-Recordable) or BD-RW (BD-Rewritable).

Also, in the fourth to sixth embodiments, it is assumed that the disc ID is recorded in the BCA, for example. The disc ID, however, may also be recorded in another area, and the manufacturer ID and the serial number may also be recorded in different areas.

Also, in the fourth to sixth embodiments, if all of the optical discs 2 set in the optical disc device 1 are the unrecorded discs at the time of initialization, the microcomputer 63 generates the authentication information from the disc IDs of all of the optical discs. The authentication information may be recorded in the optical disc 2 at the time of initialization's termination, ejection, or recording of the disc management information during recording the data.

Also, in the first to sixth embodiments, the optical disc device 1 comprises one optical pickup 3 and one spindle motor 4. The optical disc device 1, however, may also comprise plural optical pickups and spindle motors. In this case, when the microcomputer 63 issues the disc exchange command S10, the microcomputer 63 control so that the optical disc can be exchanged with an optical disc 2 which was recorded/reproduced at the earliest time, or an optical disc 2 which has been recorded/reproduced the least number of times. This allows reducing the number of times of disc exchange to record/reproduce in/from the optical disc more efficiently.

Also, in the first to sixth embodiments, the disc management information is recorded in the DMA in the optical disc 2. The disc management information, however, may also be recorded in a spare area provided in the Data Zone in FIG. 2, or another area therein.

Also, in the sixth embodiment, the defect management information about a certain optical disc 2 is recorded in another optical disc 2. Even if, however, the defect management information about a certain optical disc 2 is recorded in the optical disc 2, utilizing the identification information unique to the respective optical discs 2 allows enhancing confidentiality of the recorded information and reducing the risk of a security accident similarly.

Figures 21, 22:
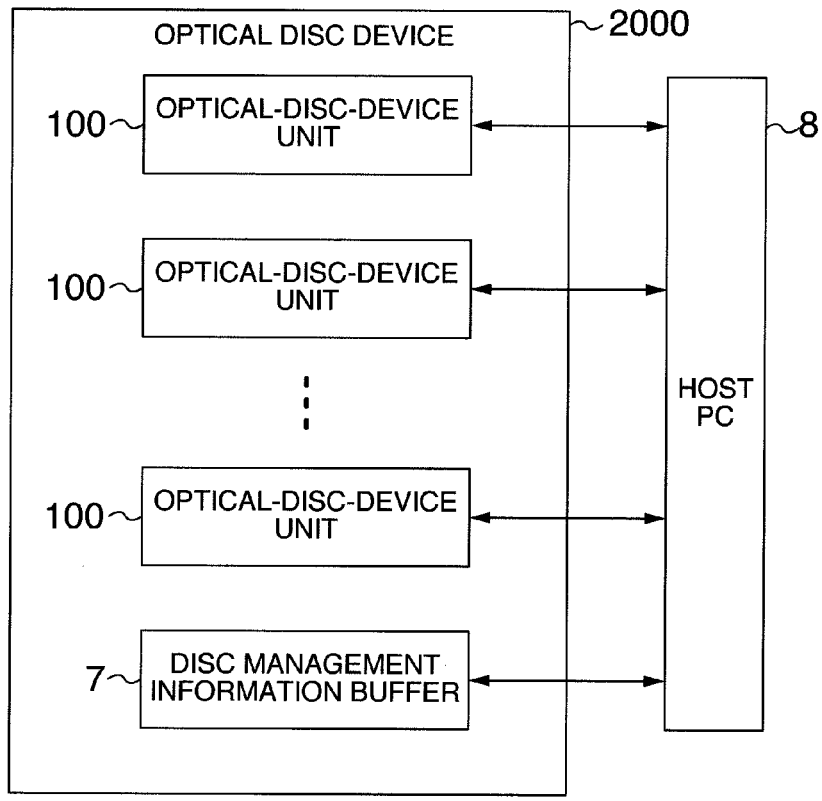
FIG. 21 is a diagram for illustrating another example (2) of the optical-disc-device unit of the present invention.
FIG. 22 is a diagram for illustrating another placement example of the defect management information of the present invention.

Also, in the third and sixth embodiments, the defect management information about a certain optical disc 2 is recorded in another optical disc 2. However, the defect management information about all of the optical discs 2 set in the optical disc device 1 excluding the optical disc 2, may also be recorded in the optical disc 2 as with another placement example of the defect management information illustrated in FIG. 22. Since, in this case, since the defect management information about all of the optical discs 2 set in the optical disc device 1 can be acquired by reading it at least the two optical discs 2 at the time of initialization, it becomes possible to shorten even further the time needed for initialization.

Figure 19:
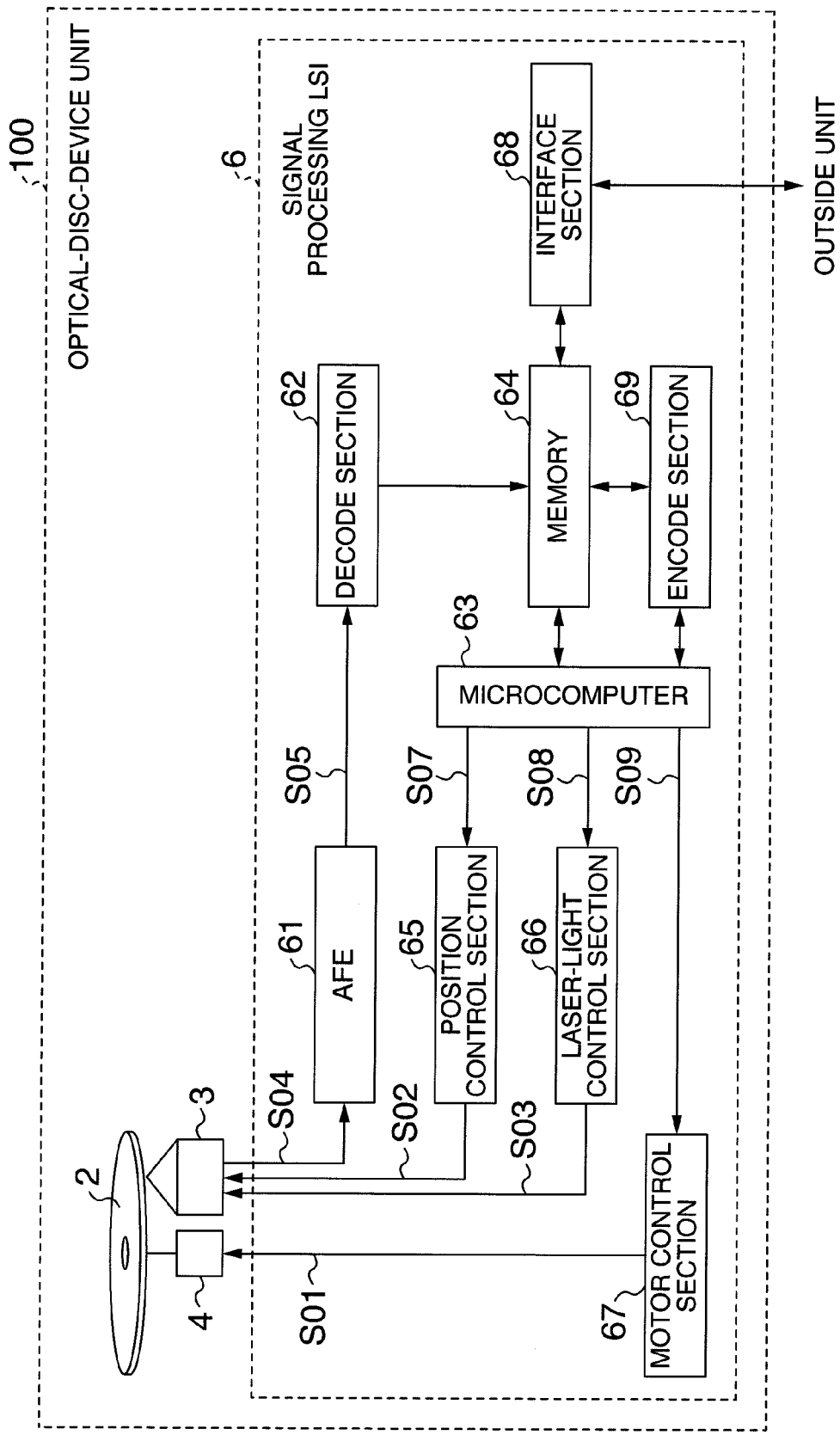
FIG. 19 is a diagram for illustrating an example of the optical-disc-device unit of the present invention.
Figure 20:
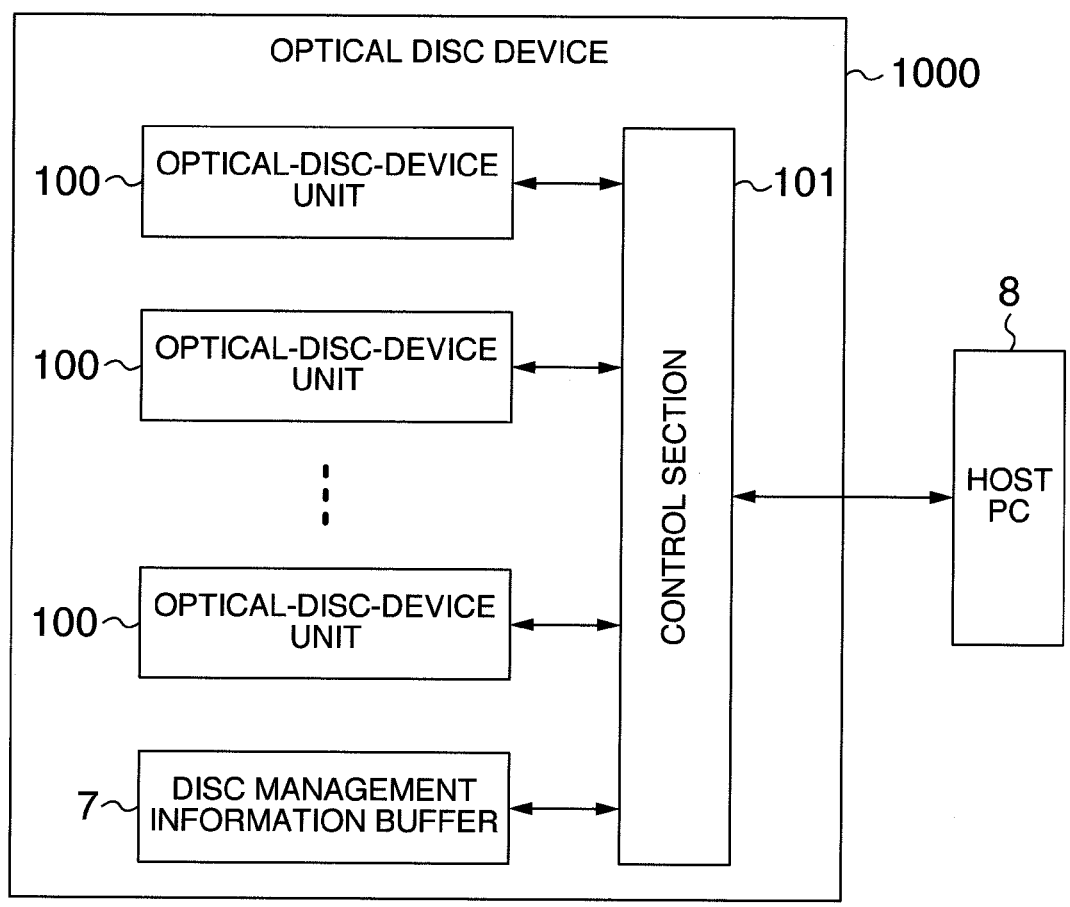
FIG. 20 is a diagram for illustrating another example (1) of the optical-disc-device unit of the present invention.

Also, in the first to sixth embodiments, the plural optical discs 2 are stored in the optical disc device 1. A plurality of optical-disc-device units 100 illustrated in FIG. 19 which record/reproduce an optical disc 2, however, may be connected to each other, and the optical disc 2 may be loaded in each of the units 100. The same reference numeral is allocated to sections in the optical disc device 1 illustrated in FIG. 1 and to the optical-disc-device unit 100 illustrated in FIG. 19 which have the same function. For example, in order to connect the plurality of optical-disc-device units 100 to each other, an optical disc device 1000 illustrated in FIG. 20 includes a control section 101 which can access the plurality of optical-disc-device units 100 and the disc management information buffer 7, and communicates with the host PC 8 in conformity with respective types of interface standards to collect and receive the command data and recorded data. Moreover, the control section 101 controls each optical-disc-device unit 100 to the record/reproduce, and read/write the disc management information from/into the disc management information buffer 7. This allows obtaining effects similar to the first to sixth embodiment's effects. Also, the effects can also be obtained even if like an optical disc device 2000 illustrated in FIG. 21, the host PC 8 directly accesses the plurality of optical-disc-device units 100 and the disc management information buffer 7 in conformity with the respective types of interface standards.

Also, in the first to sixth embodiments, at the time of initialization, the disc management information about all of the set optical discs 2 are read from an optical disc 2 and stored in the disc management information buffer 7. Moreover, at the time of ejection, the disc management information in the disc management information buffer 7 is recorded in the optical disc 2. After ejection, however, the disc management information in the disc management information buffer 7 may be stored as they are. In this case, at the time of ejection, the disc management information in the disc management information buffer 7 may or may not be recorded in the optical disc 2. Also, the disc management information in the disc management information buffer 7 may be stored in a memory device such as hard disc, SSD, or optical disc drive, which is connected to via a communications network such as the Internet. In this case, at the time of ejection, the disc management information in the disc management information buffer 7 may or may not be recorded in the optical disc 2. In these cases, the disc management information need not be read from the optical disc 2 at the time of initialization performed when using next time. Consequently, it becomes possible to shorten the time needed for initialization.

Also, in the fourth embodiment, if the authentication information has been not recorded in any optical disc of all of the set optical discs 2, "Yes" is selected in the judgment branch in the initializing process illustrated in FIG. 14 as to whether or not all of the optical discs 2 have been already selected. After that, it is confirmed whether or not the unauthenticated disc exists. If the unauthenticated disc exists, "Notify of Unrecognizable Disc" CONF 108 may be performed. If the authentication information has been not recorded in any disc, this allows further enhancing confidentiality of the recorded information and reducing the risk of a security accident.

Also, in the fourth to sixth embodiments, at the time of initialization, the disc management information is read from an optical disc 2. Then, the read disc management information is stored in the disc management information buffer 7, and, at the time of ejection, the updated disc management information is recorded in the optical disc 2. A processing like this, however, may not necessarily be performed. Instead, at the time of initialization, the authentication information is read from the optical disc 2, and the optical disc 2 may be authenticated in accordance with the read authentication information. This allows enhancing confidentiality of the recorded information and reducing the risk of a security accident.

Also, in FIG. 1, the AFE 61, the decode section 62, the microcomputer 63, the memory 64, the position control section 65, the laser-light control section 66, the motor control section 67, the interface section 68, and the encode section 69 are configured to be built in the signal processing LSI 6. The present invention, however, is not limited thereto. Some or all of these are configured to be provided separately.

Also, the microcomputer 63 controlled based on the software processes the above data, and issues the above respective types of commands. Some or all of these processes, however, may also be executed based on hardware.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:
1. An optical disc device which is configured to set therein a plurality of optical discs including a first disc and a second disc, and configured to record and/or reproduce information by illuminating said optical discs with laser light, said optical disc device comprising:
a motor configured to rotate an optical disc;
a laser-light source configured to illuminate said optical disc with said laser light, when said optical disc is being rotated by said motor;
a memory configured to store management information about at least one of said plural optical discs set in said optical disc device; and
a control section configured to control recording of said management information about said first optical disc to said second optical disc, when said management information about said first optical disc is stored in said memory;
wherein said management information includes defect management information configured to indicate an alternative recording area, in which said management information has been alternatively recorded when a defect has occurred at the time of recording of said management information in said first optical disc; and
wherein said control section controls reproducing of said defect management information about said first optical disc from said second optical disc, and reproducing of information on a data recording area of said first optical disc based on said defect management information about said first optical disc reproduced from said second optical disc.

2. The optical disc device according to claim 1, wherein when a request is made to said optical disc device to record said management information in said optical disc:
said control section is configured to control recording of said management information in said optical disc, when said management information is stored in said memory.

3. The optical disc device according to claim 2, wherein when said request is made to said optical disc device to record said management information in said optical disc:
an eject request is made for said optical disc, or
a command data configured to change said optical disc device into a power-saving mode or a sleep state is transmitted to said optical disc device from a host, when said management information is stored in said memory.

4. The optical disc device according to claim 1, wherein said control section is configured to control recording of said management information about said first and second optical discs to said second optical disc, when said management information about said first and second optical discs is stored in said memory.

5. The optical disc device according to claim 1, wherein said control section is configured to control recording of said management information about said at least one of said plural optical discs in all of said plural optical discs set in said optical disc device, when said management information is stored in said memory.

6. The optical disc device according to claim 1, wherein said control section is configured to control, with respect of said management information about said plural optical discs, recording management information about a certain optical disc in another optical disc, when said management information is stored in said memory.

7. The optical disc device according to claim 1, wherein said memory comprises a nonvolatile memory.

8. The optical disc device according to claim 1, further comprising:
an interface configured to output a signal based on identification information, said signal indicating whether or not said management information should be recorded in said optical disc;
wherein said identification information is allocated to said at least one of said plural optical discs set in said optical disc device, said identification information being unique to and recorded in said at least one of said optical discs.

9. An optical disc recording/reproducing method in an optical disc device, said optical disc device configured to set therein a plurality of optical discs including a first disc and a second disc, and configured to record and/or reproduce information by illuminating said optical discs with laser light, said optical disc recording/reproducing method comprising the steps of:
rotating an optical disc;
illuminating said optical disc with said laser light, when said optical disc is being rotated;
storing, in a memory, management information about at least one of said plural optical discs set in said optical disc device;
controlling recording of said management information about said first optical disc to said second said optical disc, when said management information about said first optical disc is stored in said memory; and recording or reproducing said information in said optical discs based on said management information recorded by said controlling;

wherein said management information includes defect management information configured to indicate an alternative recording area, in which said management information has been alternatively recorded when a defect has occurred at the time of recording of said management information in said first optical disc; and wherein said control section controls reproducing of said defect management information about said first optical disc from said second optical disc, and reproducing of information on a data recording area of said first optical disc based on said defect management information about said first optical disc reproduced from said second optical disc.

10. The optical disc recording/reproducing method according to claim 9, wherein when a request is made to said optical disc device to record said management information in said optical disc:

said optical disc device is configured to control recording of said management information in said optical disc, when said management information is stored in said memory.

11. The optical disc recording/reproducing method according to claim 10, wherein when said request is made to said optical disc device to record said management information in said optical disc:

an eject request is made for said optical disc, or a command data configured to change said optical disc device into a power-saving mode or a sleep state is transmitted to said optical disc device from a host, when said management information is stored in said memory.

12. The optical disc recording/reproducing method according to claim 9, further comprising a step of:

controlling recording of said management information about said first and second optical discs to said second optical disc, when said management information about said first and second optical discs is stored in said memory.

13. The optical disc recording/reproducing method according to claim 9, further comprising a step of:

controlling recording of said management information about said at least one of said plural optical discs in all of said plural optical discs set in said optical disc device, when said management information is stored in said memory.

14. The optical disc recording/reproducing method according to claim 9, wherein said control section configured to control, with respect of said management information about said plural optical discs, recording management information about a certain optical disc in another optical disc, when said management information is stored in said memory.

15. The optical disc recording/reproducing method according to claim 9, wherein said memory comprises a nonvolatile memory.

16. The optical disc recording/reproducing method according to claim 9, further comprising a step of:

outputting a signal based on identification information, said signal indicating whether or not said management information should be recorded in said optical disc;

wherein said identification information is allocated to said at least one of said plural optical discs set in said optical disc device, said identification information being unique to and recorded in said at least one of said optical discs.

17. An optical disc device which is configured to set therein a plurality of optical discs including a first disc and a second disc, and configured to record and/or reproduce information by illuminating said optical discs with laser light, said optical disc device comprising:

a motor configured to rotate an optical disc;

a laser-light source configured to illuminate said optical disc with said laser light, when said optical disc is being rotated by said motor; and an interface configured to output a signal on the basis of information unique to at least one of said plural optical discs set in said optical disc device, said signal indicating whether said optical discs can be recorded and/or reproduced;

wherein said management information includes defect management information configured to indicate an alternative recording area, in which said management information has been alternatively recorded when a defect has occurred at the time of recording of said management information in said first optical disc; and wherein said control section controls reproducing of said defect management information about said first optical disc from said second optical disc, and reproducing of information on a data recording area of said first optical disc based on said defect management information about said first optical disc reproduced from said second optical disc.

18. An optical disc device configured to set therein a plurality of optical discs including a first disc and a second disc, and configured to reproduce information by illuminating said optical discs with laser light, said optical disc device, comprising:

a motor section configured to rotate a optical disc;

a laser-light-emitting section configured to emit said laser light;

a memory section configured to store disc management information about said optical discs; and a control section configured to control said reproduction of said first optical disc to said second optical disc by determining a reproducing position on said second optical disc on the basis of said disc management information about said first optical disc stored in said memory section;

wherein said disc management information includes defect management information configured to indicate an alternative recording area, in which said disc management information has been alternatively recorded when a defect has occurred at the time of recording of said disc management information in said first optical disc;

wherein said control section is configured to control reading said disc management information from said optical discs and storing said disc management information in said memory section; and wherein said control section controls reproducing of said defect management information about said first optical disc from said second optical disc, and reproducing of information on a data recording area of said first optical disc based on said defect management information about said first optical disc reproduced from said second optical disc.

19. An optical disc device which is capable of setting plural optical discs therein, and which records or reproduces information by illuminating said optical discs with laser light, said optical disc device, comprising:

a motor configured to rotate an optical disc;

a laser-light source configured to illuminate said optical disc with said laser light, said optical disc being rotated by said motor;

a memory configured to store management information about part or all of said plural optical discs set in said optical disc device; and a control section controls configured to record said management information about said part or all of said optical discs in an optical disc, said management information being stored in said memory;

wherein said management information includes defect management information configured to indicate an alternative recording area, in which said management information has been alternatively recorded when a defect has occurred at the time of recording of said management information in said first optical disc;

wherein said control section controls, with respect of said management information about said plural optical discs, recording management information about a certain optical disc in another optical disc, said management information being stored in said memory; and wherein said control section controls reproducing of said defect management information about said first optical disc from said second optical disc, and reproducing of information on a data recording area of said first optical disc based on said defect management information about said first optical disc reproduced from said second optical disc.

* * * * *